(12) United States Patent (10) Patent No.: US 8,724,849 B2
Kawaguchi (45) Date of Patent: May 13, 2014

(54) INFORMATION PROCESSING DEVICE, INFORMATION PROCESSING METHOD, PROGRAM, AND INFORMATION STORAGE MEDIUM

(75) Inventor: Satoshi Kawaguchi, Kanagawa (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 398 days.

(21) Appl. No.: 13/121,318

(22) PCT Filed: Sep. 28, 2009

(86) PCT No.: PCT/JP2009/066749
§ 371 (c)(1),
(2), (4) Date: May 20, 2011

(87) PCT Pub. No.: WO2010/038693
PCT Pub. Date: Apr. 8, 2010

(65) Prior Publication Data
US 2011/0216946 A1 Sep. 8, 2011

(30) Foreign Application Priority Data

Oct. 1, 2008 (JP) ................................ 2008-256597
Oct. 1, 2008 (JP) ................................ 2008-256599

(51) Int. Cl.
*G06K 9/00* (2006.01)
(52) U.S. Cl.
USPC ........................................................ 382/103
(58) Field of Classification Search
USPC .......... 382/103, 106, 107; 348/135, 143, 154, 348/155, 169; 73/488, 490
See application file for complete search history.

(56) References Cited

U.S. PATENT DOCUMENTS 7,860,273 B2 * 12/2010 Kochi et al. ................... 382/103
8,355,529 B2    1/2013 Wu
(Continued)

FOREIGN PATENT DOCUMENTS

CN    101093582 A    12/2007
JP    2000268161 A    9/2000
(Continued)

OTHER PUBLICATIONS

Office Action for corresponding Chinese Patent Application No. 200980139029.5, dated Jan. 4, 2013.
Liu Feng, et. al., A Group Animation based on Multiple Autonomous Agents, Journal of Computer Research and Development, vol. 41, No. 1, pp. 104-110 Jan. 2004.

(Continued)

*Primary Examiner* — Daniel Mariam
*Assistant Examiner* — Shervin Nakhjavan
(74) *Attorney, Agent, or Firm* — Matthew B. Dernier, Esq.; Gibson & Dernier LLP

(57) ABSTRACT

To provide an image processing device capable of reducing a user operation in production of motion data by simulating a 3D motion of a moving object. A base data obtaining unit obtains a plurality of base data each containing an image and distance data indicating a distance between an object shown in the image and the image capturing unit, the distance data being based on a measured result. An in-image position specifying unit, based on the image obtained, specifies a position in the image, where the moving object is shown. A distance specifying unit specifies a distance between the moving object and the image capturing unit, based on the specified in-image position and the distance data. A position coordinate calculating unit calculates the 3D position coordinates of the moving object, based on the specified in-image position and the specified distance. The motion data producing unit produces motion data describing a motion of the moving object in the 3D space, based on the calculated 3D position coordinates.

7 Claims, 15 Drawing Sheets

(56) References Cited

U.S. PATENT DOCUMENTS

| | | | |
|---|---|---|---|
| 2004/0101162 A1* | 5/2004 | Higaki et al. | 382/103 |
| 2004/0233280 A1* | 11/2004 | Aoyama | 348/135 |
| 2005/0280657 A1* | 12/2005 | Hori et al. | 345/619 |
| 2006/0008116 A1* | 1/2006 | Kiraly et al. | 382/103 |
| 2008/0112592 A1* | 5/2008 | Wu et al. | 382/103 |
| 2008/0170118 A1* | 7/2008 | Albertson et al. | 348/46 |
| 2008/0316324 A1* | 12/2008 | Rofougaran et al. | 348/222.1 |

FOREIGN PATENT DOCUMENTS

| | | | |
|---|---|---|---|
| JP | 2002024143 A | 1/2002 | |
| JP | 2002259984 A | 9/2002 | |
| JP | 2004259114 A | 9/2004 | |
| JP | 2004344418 A | 12/2004 | |
| JP | 2007004732 A | 1/2007 | |
| JP | 2007333690 A | 12/2007 | |

OTHER PUBLICATIONS

Maeda et al., "Style Henkan o Mochiita Koritsuteki na Shisoku Hoko Animation Seisei", Information Processing Society of Japan Kenyu Hokoku CG, Aug. 22, 2008, vol. 20, No. 80, pp. 55-60.

International Search Report for corresponding PCT application PCT/JP2009/066749, dated Dec. 15, 2009.

Maeda et al., "Effective Creation of Quadruped Animation using Style Translation", Information Processing Society of Japan Kenyu Hokoku CG, Aug. 22, 2008, vol. 20, No. 80, pp. 55-60.

Office Action for corresponding Chinese Patent Application No. 200980139029.5, dated Aug. 14, 2013.

Office Action for corresponding JP Application No. 2008-256597, dated May 8, 2012.

International Preliminary Report on Patentability and Written Opinion for corresponding PCT application PCT/JP2009/066749, dated May 19, 2011.

* cited by examiner

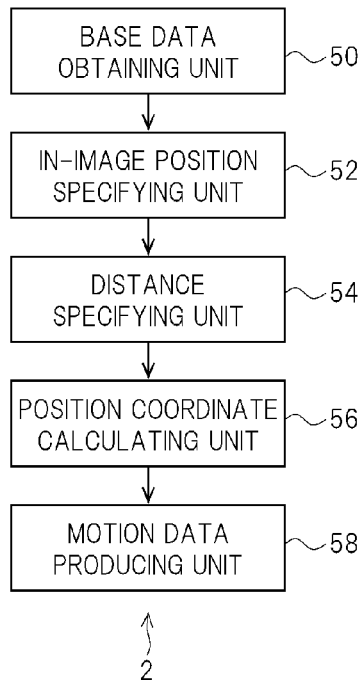
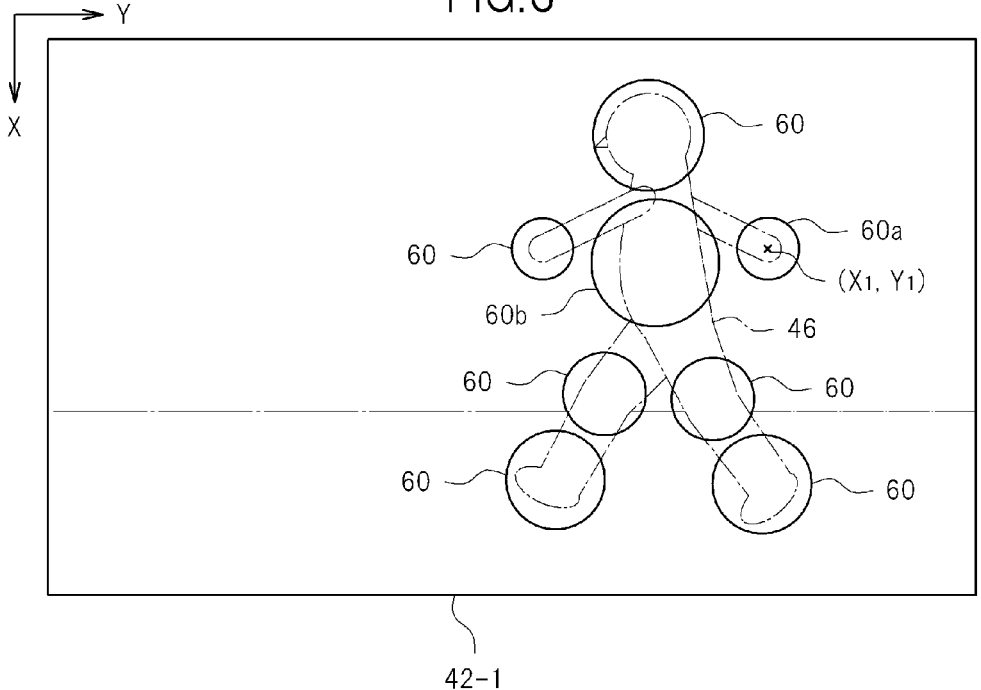

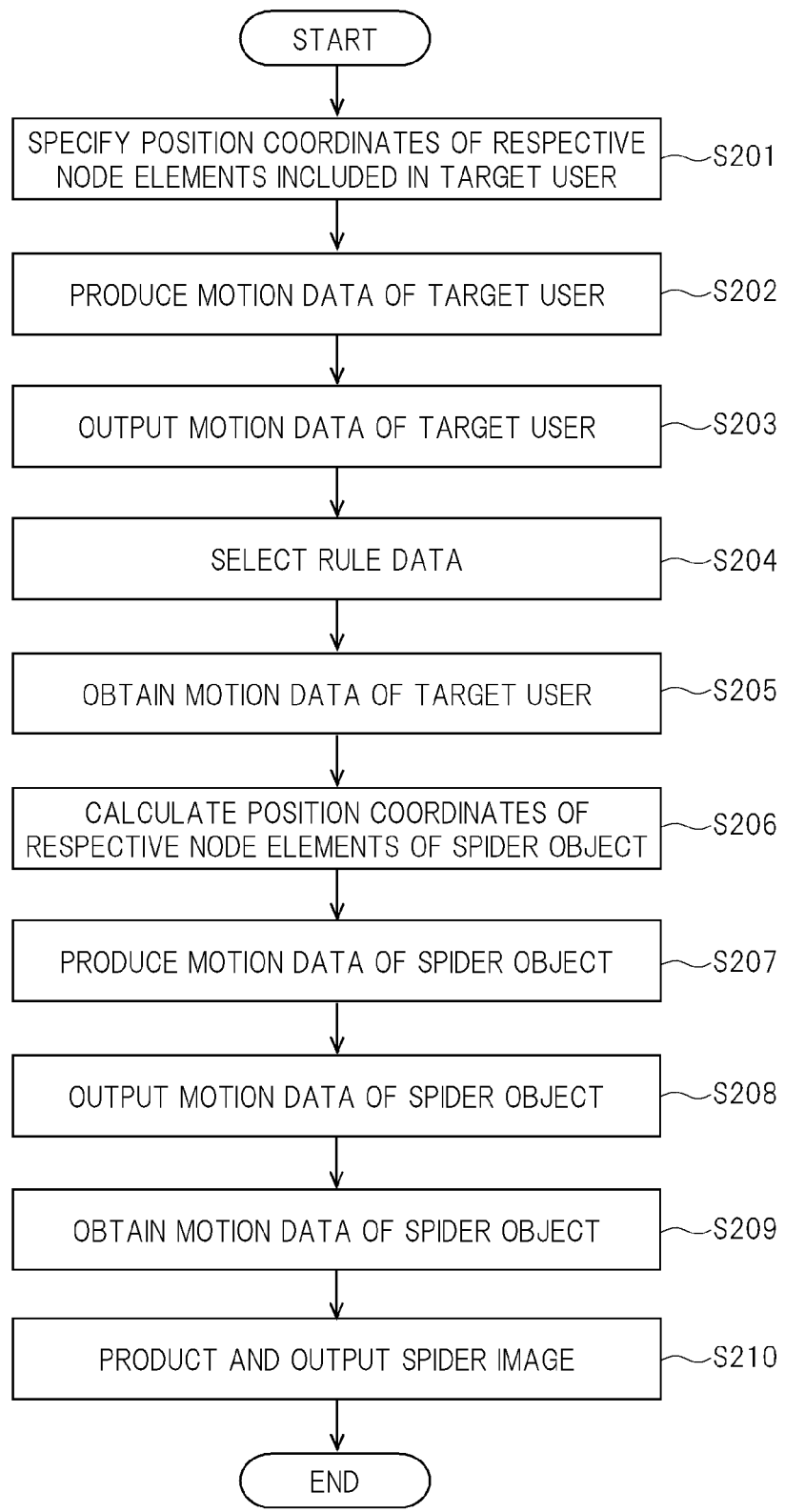

INFORMATION PROCESSING DEVICE, INFORMATION PROCESSING METHOD, PROGRAM, AND INFORMATION STORAGE MEDIUM

TECHNICAL FIELD

The present invention relates to an information processing device, an information processing method, a program, and an information storage medium.

BACKGROUND ART

There has been known a technique related to motion capturing for capturing into an image processing device, motion of a moving object, such as a person, subjected to image capturing on a video camera. For example, there have been available information processing devices for producing motion data describing a motion of a moving object, based on a series of images produced by capturing an image of the moving object on a video camera. Some of such image processing devices can produce motion data by simulating a 3D motion of a moving object when a user puts marks on some positions in a produced image and designates anteroposterior relationship of a respective mark.

SUMMARY OF THE INVENTION

However, a conventional information processing devices requires a user to designate a position in an image in production of motion data by simulating a 3D motion of a moving object. That is, some operation is required.

Here, motion data produced through motion capturing or the like is utilized in creation of computer graphics, or CG, or the like, and CG showing, e.g., a person in motion can be readily created utilizing motion data produced by capturing an image of a person moving. However, creation of CG showing a spider moving, for example, requires appropriate modification, or the like, to be carried out to the motion data produced by capturing an image of a person moving. That is, conventionally, CG creation utilizing motion data requires an operation by a creator. In particular, creation of CG showing a moving object moving, utilizing motion data showing a predetermined moving object, other than that moving object, moving requires an operation by a creator.

The present invention has been conceived in view of the above, and one object thereof is to provide an information processing device, an information processing method, a program, and an information storage medium capable of reducing a user operation required in production of motion data by simulating a 3D motion of a moving object.

Another object of the present invention is to provide an information processing device, an information processing method, a program, and an information storage medium capable of reducing an operation by a creator required in CG creation utilizing motion data.

In order to solve the above described problems, an information processing device according to the present invention is an information processing device for producing motion data describing a motion of a predetermined moving object, comprising a base data obtaining unit for obtaining a plurality of base data each containing an image produced by capturing an image of at least one object, including the moving object, using an image capturing unit, and distance data indicating a distance between the object shown in the image and the image capturing unit, the distance data being based on a measured result obtained by a distance measuring unit; an in-image position specifying unit for specifying an in-image position where the moving object is shown in the image, based on the image contained in each base data; a distance specifying unit for specifying a distance between the moving object and the image capturing unit, based on the in-image position specified by the in-image position specifying unit and the distance data contained in the base data that contains the image; a position coordinate calculating unit for calculating position coordinates of the moving object in a 3D space, based on the in-image position specified by the in-image position specifying unit and the distance specified by the distance specifying unit; and a motion data producing unit for producing motion data describing a motion of the moving object in the 3D space, based on the position coordinates calculated based on the base data.

Further, an information processing method according to the present invention is an information processing method for producing motion data describing a motion of a predetermined moving object, comprising a base data obtaining step of obtaining a plurality of base data each containing an image produced by capturing an image of at least one object, including the moving object, using an image capturing unit, and distance data indicating a distance between the object shown in the image and the image capturing unit, the distance data being based on a measured result obtained by a distance measuring unit; an in-image position specifying step of specifying an in-image position where the moving object is shown in the image, based on the image contained in each base data; a distance specifying step of specifying a distance between the moving object and the image capturing unit, based on the in-image position specified at the in-image position specifying step and the distance data contained in the base data that contains the image; a position coordinate calculating step of calculating position coordinates of the moving object in a 3D space, based on the in-image position specified at the in-image position specifying step and the distance specified at the distance specifying step; and a motion data producing step of producing motion data describing a motion of the moving object in the 3D space, based on the position coordinates calculated based on the base data.

Further, a program according to the present invention is a program for causing a computer to function as an information processing device for producing motion data describing a motion of a predetermined moving object, the program for causing the computer to function as a base data obtaining unit for obtaining a plurality of base data each containing an image produced by capturing an image of at least one object, including the moving object, using an image capturing unit, and distance data indicating a distance between the object shown in the image and the image capturing unit, the distance data being based on a measured result obtained by a distance measuring unit; an in-image position specifying unit for specifying an in-image position where the moving object is shown in the image, based on the image contained in each base data; a distance specifying unit for specifying a distance between the moving object and the image capturing unit, based on the in-image position specified by the in-image position specifying unit and the distance data contained in the base data that contains the image; a position coordinate calculating unit for calculating position coordinates of the moving object in a 3D space, based on the in-image position specified by the in-image position specifying unit and the distance specified by the distance specifying unit; and a motion data producing unit for producing motion data describing a motion of the moving object in the 3D space, based on the position coordinates calculated based on the base data.

Further, a computer readable information storage medium according to the present invention is a computer readable information storage medium storing a program for causing a computer to function as an information processing device for producing motion data describing a motion of a predetermined moving object, the program for causing the computer to function as a base data obtaining unit for obtaining a plurality of base data each containing an image produced by capturing an image of at least one object, including the moving object, using an image capturing unit, and distance data indicating a distance between the object shown in the image and the image capturing unit, the distance data being based on a measured result obtained by a distance measuring unit; an in-image position specifying unit for specifying an in-image position where the moving object is shown in the image, based on the image contained in each base data; a distance specifying unit for specifying a distance between the moving object and the image capturing unit, based on the in-image position specified by the in-image position specifying unit and the distance data contained in the base data that contains the image; a position coordinate calculating unit for calculating position coordinates of the moving object in a 3D space, based on the in-image position specified by the in-image position specifying unit and the distance specified by the distance specifying unit; and a motion data producing unit for producing motion data describing a motion of the moving object in the 3D space, based on the position coordinates calculated based on the base data.

According to the present invention, it is possible to reduce a user operation required in production of motion data by simulating a 3D motion of a moving object as position coordinates of the moving object in a 3D space are calculated, based on the distance data obtained based on a measured result by the distance measuring unit.

According to one aspect of the present invention, the moving object may include a plurality of elements, the in-image position specifying unit may specify an in-image position where each of at least some of the elements included in the moving object is shown, the distance specifying unit may specify a distance between each of the at least some of the elements included in the moving object and the image capturing unit, the position coordinate calculating unit may calculate position coordinates in the 3D space, of each of the at least some of the elements included in the moving object, and when position coordinates of a missing element among the plurality of elements included in the moving object are not calculated by the position coordinate calculating unit, based on the base data, the position coordinate calculating unit may calculate the position coordinates of the missing element, based on base data different from the base data among the plurality of base data obtained by the base data obtaining unit. With the above, when the position coordinates of a missing element in the 3D space are not calculated based on the base data, the position coordinates of the missing element in the 3D space can be calculated based on base data different from the base data among a plurality of base data obtained by the base data obtaining means.

According to this aspect, when a situation in which the position coordinates of the missing element are not calculated by the position coordinate calculating unit lasts for a predetermined period of time, the position coordinate calculating unit may calculate the position coordinates of the missing element, based on position coordinates of the missing element last calculated before the predetermined period of time and position coordinates of the missing element initially calculated after the predetermined period of time. With the above, when a situation in which the position coordinates of a missing element in the 3D space are not calculated lasts for a predetermined period of time, the position coordinates of the missing element in the 3D space can be calculated based on the position coordinates of the missing elements calculated immediately before and after, respectively, the predetermined period of time.

According to this aspect, when the position coordinates of the missing element are not calculated by the position coordinate calculating unit, the position coordinates of the missing element may be calculated based on a difference in position coordinates of the missing element, calculated based on a plurality of respective base data different from the base data. With the above, when the position coordinates of a missing element in the 3D space are not calculated based on the base data, the position coordinates of the missing element in the 3D space can be calculated using information relating to a difference in the position coordinates of the missing elements in the 3D space, calculated based on a plurality of base data different from the base data.

According to another aspect of the present invention, the base data may contain images produced using a plurality of respective image capturing unit and distance data indicating distances between the object shown in the respective images and the respective image capturing unit that capture the respective images, the in-image position specifying unit, based on the plurality of respective images contained in the base data, may specify in-image positions where the moving object is shown in the respective images, the distance specifying unit may specify a distance between the moving object and each of the plurality of image capturing unit, and the position coordinate calculating unit may calculate the position coordinates, based on the plurality of in-image positions specified by the in-image position specifying unit and the plurality of distances specified by the distance specifying unit. With the above, as a smaller dead angle is resulted in capturing an image of an object, using an image capturing unit, it is possible to reduce a possibility that the position coordinates of the moving object in the 3D space are not calculated based on the base data.

Another information processing device according to the present invention is an information processing device for producing, based on base motion data describing a motion of a predetermined moving object, produced motion data describing a motion of another moving object, comprising a rule data storage unit for storing a plurality of rule data so as to be each correlated to an identifier of a moving object, the rule data defining a rule for determining a motion of a moving object identified by the identifier, based on the motion of the predetermined moving object; an identifier receiving unit for receiving an identifier of a moving object; a base motion data obtaining unit for obtaining the base motion data; a rule data selecting unit for selecting rule data correlated to the identifier received by the identifier receiving unit from among the plurality of rule data stored in the rule data storage unit; and a produced motion data producing unit for producing produced motion data describing a motion of the moving object identified by the identifier received by the identifier receiving unit by applying a rule defined by the rule data selected by the rule data selecting unit to the base motion data obtained by the base motion data obtaining unit.

Another information processing method according to the present invention is an information processing method for producing, based on base motion data describing a motion of a predetermined moving object, produced motion data describing a motion of another moving object, comprising a step of storing in a rule data storage unit a plurality of rule data so as to be each correlated to an identifier of a moving object, the rule data defining a rule for determining a motion of a moving object identified by the identifier, based on the motion of the predetermined moving object; a base motion data obtaining step of obtaining the base motion data; an identifier receiving step of receiving an identifier of a moving object; a rule data selecting step of selecting rule data correlated to the identifier received at the identifier receiving step from among the plurality of rule data stored in the rule data storage unit; and a produced motion data producing step of producing produced motion data describing a motion of the moving object identified by the identifier received at the identifier receiving step by applying a rule defined by the rule data selected at the rule data selecting step to the base motion data obtained at the base motion data obtaining step.

Another program according to the present invention is a program for causing a computer to function as an image processing device for producing, based on base motion data describing a motion of a predetermined moving object, produced motion data describing a motion of another moving object, the program for causing the computer to function as a unit for storing in a rule data storage unit a plurality of rule data so as to be each correlated to an identifier of a moving object, the rule data defining a rule for determining a motion of a moving object identified by the identifier, based on the motion of the predetermined moving object; a base motion data obtaining unit for obtaining the base motion data; an identifier receiving unit for receiving an identifier of a moving object; a rule data selecting unit for selecting rule data correlated to the identifier received by the identifier receiving unit from among the plurality of rule data stored in the rule data storage unit; and a produced motion data producing unit for producing produced motion data describing a motion of the moving object identified by the identifier received by the identifier receiving unit by applying a rule defined by the rule data selected by the rule data selecting unit to the base motion data obtained by the base motion data obtaining unit.

Another information storage medium according to the present invention is a computer readable information storage medium storing a program for causing a computer to function as an image processing device for producing, based on base motion data describing a motion of a predetermined moving object, produced motion data describing a motion of another moving object, the program for causing the computer to function as a unit for storing in a rule data storage unit a plurality of rule data so as to be each correlated to an identifier of a moving object, the rule data defining a rule for determining a motion of a moving object identified by the identifier, based on the motion of the predetermined moving object; abase motion data obtaining unit for obtaining the base motion data; an identifier receiving unit for receiving an identifier of a moving object; a rule data selecting unit for selecting rule data correlated to the identifier received by the identifier receiving unit from among the plurality of rule data stored in the rule data storage unit; and a produced motion data producing unit for producing produced motion data describing a motion of the moving object identified by the identifier received by the identifier receiving unit by applying a rule defined by the rule data selected by the rule data selecting unit to the base motion data obtained by the base motion data obtaining unit.

According to the present invention, it is possible to reduce an operation by a creator in CG creation utilizing motion data as motion data describing a motion of a moving object identified by an identifier received by the identifier receiving unit can be produced based on the base motion data describing a motion of a predetermined moving object.

According to one aspect of the present invention, the base motion data may indicate a position of the predetermined moving object in each frame, the rule data storage unit may store rule data defining a rule for determining a position of the moving object identified by the identifier in each frame, based on the position of the predetermined moving object in each frame, the base motion data obtaining unit may sequentially obtain the base motion data, and the produced motion data producing unit may sequentially produce the produced motion data each indicating the position of the moving object identified by the identifier received by the identifier receiving unit in each frame by sequentially applying the rule defined by the rule data selected by the rule data selecting unit to the respective base motion data sequentially obtained. With the above, produced motion data describing the position of the moving object in each frame can be produced based on the position of the moving object in each frame, indicated by the base motion data.

According to this aspect, the rule data storage unit may store rule data defining a rule for determining the position of the moving object identified by the identifier in each frame, based on a combination of the positions of the predetermined moving object in a plurality of different frames. With the above, the produced motion data can be produced based on the positions of the predetermined moving object in different frames, variation of the produced motion data becomes more abundant.

According to this aspect, the base motion data may describe a motion of each of a plurality of elements included in the predetermined moving object, the rule data storage unit may store rule data so as to be correlated to an identifier of a moving object including a plurality of elements, the rule data defining a rule for determining a motion of each of the plurality of elements included in the moving object identified by the identifier, based on a motion of each of the plurality of elements included in the predetermined moving object, and the produced motion data producing unit may produce produced motion data describing a motion of each of the plurality of elements included in the moving object identified by the identifier received by the identifier receiving unit. With the above, it is possible to correlate the respective motions, described by the produced motion data, of the respective elements included in the moving object identified by the identifier received by the identifier receiving unit to the respective motions of the respective elements included in the predetermined moving object.

According to this aspect, the rule data storage unit may store rule data defining a rule for correlating a combination of respective positions of the plurality of elements included in either one of the predetermined moving object and the moving object identified by the identifier to one element included in another of the predetermined moving object and the moving object identified by the identifier. With the above, it is possible to calculate the position of one element included in the moving object identified by the identifier received by the identifier receiving unit, based on a combination of the positions of two or more elements included in the predetermined moving object, or to calculate the respective positions of two or more elements included in the moving object identified by the identifier received by the identifier receiving unit, based on the position of one element included in the predetermined moving object.

BRIEF DESCRIPTION OF THE DRAWINGS

FIG. 5 is a functional block diagram showing one example of a function of an information processing device according to the first embodiment of the present invention;

FIG. 6 is a diagram showing one example of the positions of respective elements in the first user image;

FIG. 23 is a diagram showing one example of a flow of a process carried out in an information processing device according to the second embodiment of the present invention.

DETAILED DESCRIPTION OF THE PREFERRED EMBODIMENTS

[First Embodiment]

In the following, one embodiment, or a first embodiment, of the present invention will be described in detail with reference to the accompanying drawings.

Figure 1:
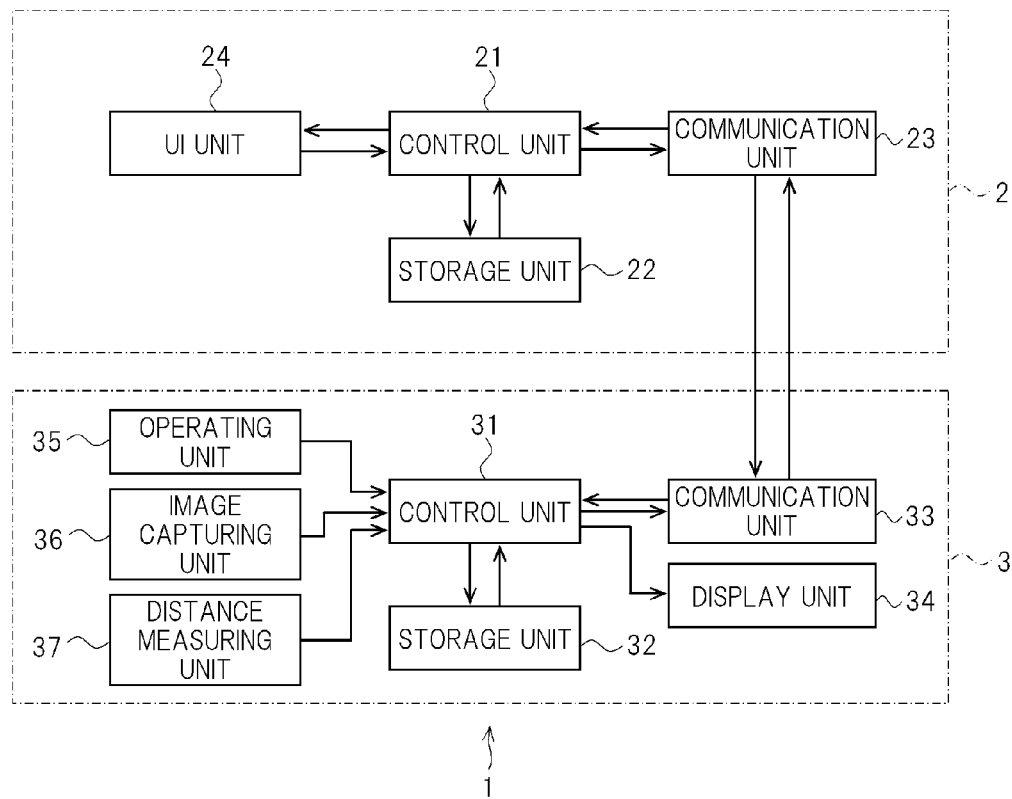
FIG. 1 is a hardware structural diagram showing one example of a hardware structure of an information processing system according to a first embodiment of the present invention.
Figure 2:
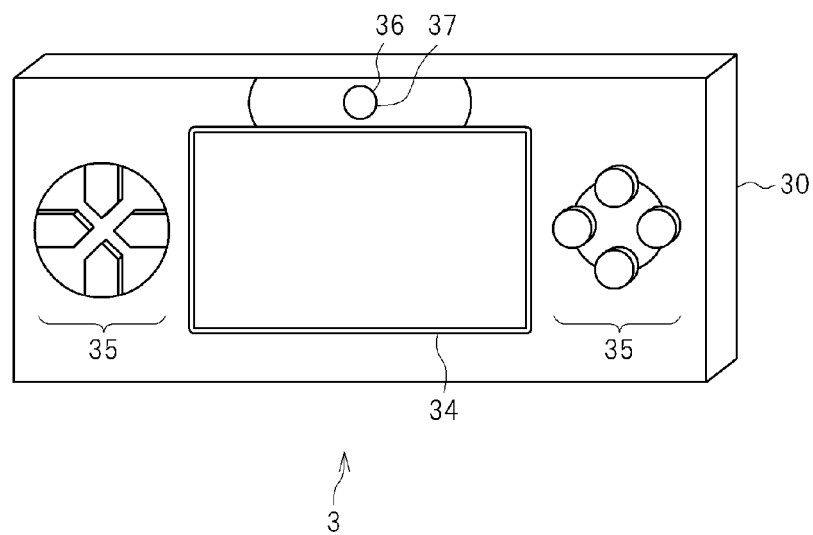
FIG. 2 is a perspective view showing one example of a portable game device according to the first embodiment of the present invention.

FIG. 1 is a diagram showing one example of a hardware structure of an information processing system 1 according to the first embodiment. As shown in FIG. 1, the information processing system according to the first embodiment comprises an information processing device 2 and a portable game device 3. FIG. 2 is a perspective view showing one example of the portable game device 3 according to the first embodiment.

The information processing device 2 comprises a control unit 21, a storage unit 22, a communication unit 23, and a user interface (UI) unit 24, all of which are connected to one another via a bus.

The control unit 21 of the information processing device 2 is a program control device, such as a CPU, and operates according to a program installed in the information processing device 2.

The storage unit 22 of the information processing device 2 is a storage element, such as a RAM, a hard disk drive, or the like. In the storage unit 22 of the information processing device 2, a program or the like to be executed by the control unit 21 of the information processing device 2 is stored. The storage unit 22 of the information processing device 2 operates also as a working memory of the control unit 21 of the information processing device 2.

The communication unit 23 of the information processing device 2 is, e.g., a network interface or the like, and sends information according to an instruction input from the control unit 21 of the information processing device 2. Further, the communication unit 23 of the information processing device 2 outputs information received via a network, such as a LAN, to the control unit 21 of the information processing device 2.

The UI unit 24 of the information processing device 2 is a display, a microphone, a speaker, a button, or the like, and outputs content of an operation carried out by a user or a sound input by a user to the control unit 21. The UI unit 24 of the information processing device 2 outputs information as image or sound according to an instruction input from the control unit 21 of the information processing device 2.

As shown in FIG. 2, the housing 30 of the first portable game device 3 according to the first embodiment is shaped like a box. As shown in FIG. 1, the portable game device 3 according to the first embodiment comprises a control unit 31, a storage unit 32, a communication unit 33, a display unit 34, an operating unit 35, an image capturing unit 36, and a distance measuring unit 37.

The control unit 31 of the portable game device 3 is a program control device, such as a CPU, and operates according to a program stored in the storage unit 32 of the portable game device 3.

The storage unit 32 of the portable game device 3 is a storage element, such as a RAM, a hard disk drive, or the like. In the storage unit 32 of the portable game device 3, a program or the like to be executed by the control unit 31 of the portable game device 3 is stored. Specifically, for example, a game program to be executed in the control unit 31 of the portable game device 3 is stored. The game program is supplied via an information transmitting medium, such as, e.g., a disk, a CD-ROM, or a DVD-ROM, or a communication network, such as the Internet, to the portable game device 3. The storage unit 32 of the portable game device 3 operates also as a working memory of the control unit 31 of the portable game device 3.

The communication unit 33 of the portable game device 3 is, e.g., a network interface or the like (specifically, e.g., a wireless LAN module), and sends information to the information processing device 2 or the like according to an instruction input from the control unit 31 of the portable game device 3. Further, the communication unit 33 of the portable game device 3 outputs received information to the control unit 31 of the portable game device 3.

In the first embodiment, the communication unit 23 of the information processing device 2 and the communication unit 33 of the portable game device 3 are connected to a network, such as a LAN, and can communicate to each other. The network may be either of a wired and radio one.

The display unit 34 of the portable game device 3 is e.g., a liquid crystal display or the like, and shows an image according to an instruction from the control unit 31 of the portable game device 3. In the first embodiment, the display unit 34 of the portable game device 3 is provided in the middle of the front surface of the housing 30 of the portable game device 3. The control unit 31 of the portable game device 3 may additionally designate to the display unit 34 of the portable game device 3, attributes, such as resolution, an aspect ratio, and so forth, of an image shown. Further, the control unit 31 of the portable game device 3 may designate to the display unit 34 of the portable game device 3, attributes of an image that is shown on the display unit 34 of the portable game device 3 according to the content of attribute information relating to attributes, such as resolution, an aspect ratio, and so forth, of an image, contained in a program executed.

The operating unit 35 of the portable game device 3 is, e.g., an operating member (specifically, e.g., a cross key or a button), and outputs output data in accordance with an operation carried out on the operating member to the control unit 31 of the portable game device 3. Having obtained the output data, the control unit 31 of the portable game device 3 carries out processing, using the output data, in accordance with the operation carried out by a user on the operating member. In the first embodiment, the operating unit 35 of the portable game device 3 is provided on the left and right respective sides of the display unit 34 of the portable game device 3. That is, the operating unit 35 of the portable game device 3 is provided separately on the left and right respective sides on the front surface of the housing 30 of the portable game device 3.

The image capturing unit 36 of the portable game device 3 comprises, e.g., a publicly known digital camera, and produces a black/white, grey scaled, or colored image (e.g., a JPEG image) every predetermined period of time (e.g., 1/60th of a second). The image capturing unit 36 of the portable game device 3 may be either of a normal camera, a tele-photo camera, and a wide-angle camera. In the first embodiment, the image capturing unit 36 of the portable game device 3 is provided on the upper side of the display unit 34 of the portable game device 3. That is, the image capturing unit 36 of the portable game device 3 is provided on an upper part near the middle of the front surface of the housing 30.

The distance measuring unit 37 of the portable game device 3 measures the distance between the portable game device 3 and an outside object present outside the portable game device 3. The distance measuring unit 37 of the portable game device 3 measures the distance (hereinafter referred to as an object distance), e.g., between the image capturing unit 36 of the portable game device 3 and an outside object (more specifically, e.g., a surface of an outside object), and produces distance data 44 indicating an object distance (see FIG. 3). Details of the distance data 44 are described later.

In the first embodiment, the distance measuring unit 37 of the portable game device 3 produces distance data 44 that correlates each of the pixels included in an image produced by the image capturing unit 36 of the portable game device 3 to an object distance corresponding to the pixel. That is, in the first embodiment, the position of a pixel in an image produced by the image capturing unit 36 of the portable game device 3 has a unique, i.e., one-to-one, correspondence with an object distance measured by the distance measuring unit 37 of the portable game device 3.

The distance measuring unit 37 of the portable game device 3 is, specifically, e.g., a stereo camera comprising a plurality of lenses, and measures the distance between an outside object and the portable game device 3, based on the parallaxes of the respective lenses. Obviously, the distance measuring unit 37 of the portable game device 3 is not limited to a stereo camera, and may output infrared radiation, then measure a period of time elapsing between the output of infrared radiation and the return of the output infrared radiation after being reflected by an image capturing object, and measure the distance between the portable game device 3 and the outside object, based on the measured period of time. Alternatively, the distance measuring unit 37 of the portable game device 3 may comprise a plurality of lenses having different focal distances, and measure the distance between an outside object and the portable game device 3, relying on a lens that is focused on the outside object among the plurality of lenses. In the first embodiment, the distance measuring unit 37 of the portable game device 3 is formed integral to the image capturing unit 36 of the portable game device 3, and provided on the upper side of the display unit 34. That is, the distance measuring unit 37 of the portable game device 3 is provided on an upper part near the middle of the front surface.

Figure 3:
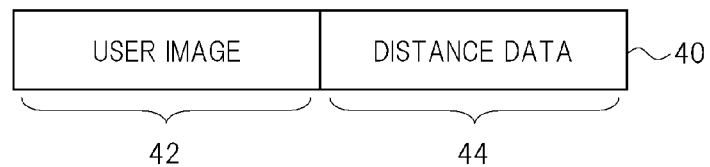
FIG. 3 is a diagram showing one example of a data structure of base data.

In the first embodiment, the portable game device 3 produces base data 40, and sends to the information processing device 2 (see FIG. 3). FIG. 3 is a diagram showing one example of a data structure of the base data 40. As shown in FIG. 3, the base data 40 contains a user image 42 and the distance data 44.

In the first embodiment, the image capturing unit 36 of the portable game device 3 captures an image of an image capturing object user 46 (hereinafter referred to as a target user 46) moving every predetermined period of time (e.g., 1/60th of a second) to produce serial user images 42 (see FIGS. 4A to 4E). Note that the target user 46 is a mere example of a moving object, and the image capturing unit 36 may capture an image of any moving object moving other than the target user 46 to produce an image of the moving object.

In the first embodiment, specifically, for example, the image capturing unit 36 captures an image of the target user 46 to sequentially produce an $n^{th}$ user image 42-n (n=1, 2, 3, and so forth). FIGS. 4A, 4B, 4C, 4D, and 4E respectively show one example of a first user image 42-1, one example of a second user image 42-2, one example of a third user image 42-3, and one example of a fourth user image 42-4, and one example of a fifth user image 42-5. As shown in FIGS. 4A to FIG. 4E, not only the target user 46 but also a ground surface 48 are shown in the user image 42 according to the first embodiment. That is, at least one object, including a moving object, such as the target user 46, is shown in an image produced by the image capturing unit 36. Meanwhile, the distance measuring unit 37 of the portable game device 3 sequentially measures the distance between the target user 46 and the portable game device 3 to produce $n^{th}$ distance data 44-n that correlates each element in the $n^{th}$ user image 42-n to a corresponding object distance. Then, the control unit 31 of the portable game device 3 produces $n^{th}$ base data 40-n that contains the $n^{th}$ user image 42-n and the $n^{th}$ distance data 44-n corresponding to that user image 42.

Thereafter, the communication unit 33 of the portable game device 3 sends the base data 40 to the information processing device 2, and the communication unit 23 of the information processing device 2 receives the base data 40.

In the following, functions realized in the information processing device 2 according to the first embodiment will be described. FIG. 5 is a functional block diagram of the information processing device 2 according to this embodiment. As shown in FIG. 5, the information processing device 2 according to the first embodiment functionally comprises a base data obtaining unit 50, an in-image position specifying unit 52, a distance specifying unit 54, a position coordinate calculating unit 56, and a motion data producing unit 58. These components are realized by executing a program installed in the information processing device 2, which is a computer, by the control unit 21, such as a CPU, in the information processing device 2. Note that the program is supplied to the information processing device 2 via a computer readable information transmitting medium, such as, e.g., a CD-ROM, a DVD-ROM, and so forth, or a communication network, such as the Internet or the like.

The base data obtaining unit 50 obtains a plurality of base data 40 each containing an image and distance data 44. In the first embodiment, the base data obtaining unit 50 sequentially obtains the base data 40 containing the user image 42 and the distance data 40, the base data 40 being sent by the communication unit 33 of the portable game device 3 and received by the communication unit 23 of the information processing device 2.

The in-image position specifying unit 52 specifies a position in an image (the user image 42 in the first embodiment), where a predetermined moving object (the target user 46 in the first embodiment) is shown, based on the image (the user image 42 in the first embodiment) contained in the base data 40.

In the first embodiment, the target user 46 includes a plurality of elements 60 (see FIG. 6). In this embodiment, the respective elements 60 correspond to respective parts of the body of the target user 46, such as, e.g., a head, a body, a left knee, a right knee, a left foot, a right foot, a left hand, a right hand, and so forth. The in-image position specifying unit 52 specifies the positions of the respective elements 60 in the user image 42, using, e.g., a pattern recognition technique. FIG. 6 is a diagram showing one example of the positions of the respective elements 60, including the right hand element 60a representing the right hand and the body element 60b representing the body, in the first user image 42-1, the positions being specified by the in-image position specifying unit 52.

In the above, the in-image position specifying unit 52 may specify the positions of the respective elements 60, based on the colors of the respective pixels in the user image 42. Alternatively, the in-image position specifying unit 52 may specify the position of each element 60 in the user image 42, using an existent optical motion capturing technique, or the like.

Note that the in-image position specifying unit 52 may specify the position coordinates of each element, using a specifying method data indicating a method for specifying the elements 60 included in the target user 46 and the position of each element 60 in the user image 42, the specifying method data being stored in advance in the storage unit 22 of the information processing device 2.

The in-image position specifying unit 52 may specify the position coordinates of a representative point (e.g., the center of gravity of an area where each element 60 is shown) representing each element 60. In the first embodiment, the in-image position specifying unit 52 specifies the position coordinates of the center of gravity (the right hand center of gravity) of an area where the right hand element 60a is shown in the $n^{th}$ user image 42-n (the right hand $n^{th}$ in-image position coordinates) $(X_n, Y_n)$. FIG. 6 additionally shows the right hand first in-image position coordinates $(X_1, Y_1)$ specified by the in-image position specifying unit 52. Note that the right hand $n^{th}$ in-image position coordinates $(X_n, Y_n)$ are expressed using position coordinates in a 2D coordinate system having the origin being the upper left point of the $n^{th}$ user image 42-n, the X axis extending in the lower direction, and the Y axis extending in the rightward direction. Note that the method for expressing in-image position coordinates is not limited to the above-described method.

Figure 7:
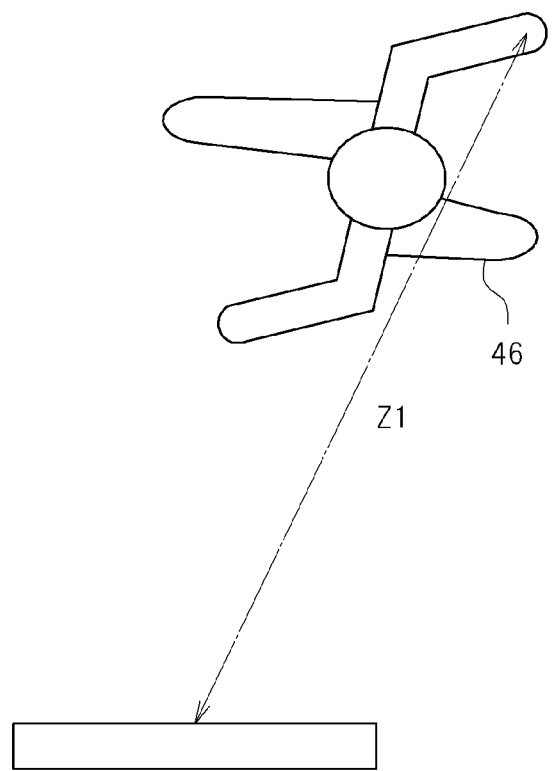
FIG. 7 is a diagram showing one example of a right hand first object distance.

The distance specifying unit 54 specifies the distance between a moving object and the image capturing unit 36 of the portable game device 3, based on a position in an image (an in-image position), specified by the in-image position specifying unit 52 and the distance data 44 contained in the base data 40 that contains that image. In the first embodiment, the distance specifying unit 54 specifies an object distance correlated to the position coordinates of the representative point of each element 60 included in the user image 40, the object distance being indicated by the distance data 44 contained in the base data 40 that contains the user image 42. Specifically, for example, an object distance correlated to a pixel at the right hand $n^{th}$ in-image position coordinates $(X_n, Y_n)$ and indicated by the $n^{th}$ distance data 44-n are specified as the right hand $n^{th}$ object distance $Z_n$. FIG. 7 shows one example of the right hand first object distance $Z_1$. Note that the distance specifying unit 54 may specify an object distance, using a method different from the above described method. Specifically, for example, the average of the object distances correlated to the respective pixels in an area where the right hand element 60a is shown in the $n^{th}$ user image 42-n may be specified as the right hand $n^{th}$ object distance $Z_n$.

The position coordinate calculating unit 56 calculates the position coordinates of a moving object in the 3D space, based on the in-image position specified by the in-image position specifying unit 52 and the distance specified by the distance specifying unit 54. In the first embodiment, the position coordinate calculating unit 56 calculates the $n^{th}$ 3D position coordinates of the representative point of each element 60 included in the $n^{th}$ user image 42-n, based on the position coordinates of the representative point included in the $n^{th}$ user image 42-n and the object distance correlated to the position coordinates, the object distance being specified based on the $n^{th}$ distance data 44-n by the distance specifying unit 54. More specifically, for example, the position coordinate calculating unit 56 calculates the right hand $n^{th}$ 3D position coordinates $(x_n, y_n, z_n)$, based on the right hand $n^{th}$ in-image position coordinates $(X_n, Y_n)$ and the right hand $n^{th}$ object distance $Z_n$ (see FIG. 8). Note that the position coordinate calculating unit 56 may calculate the body $n^{th}$ 3D position coordinates $(x_n', y_n', z_n')$, using a similar method. Note that although the 3D position coordinates are expressed in an orthogonal coordinate system in the first embodiment, 3D position coordinates may be expressed in any other coordinate system, such as a polar coordinate system or the like.

The motion data producing unit 58 produces motion data describing a motion of a moving object in the 3D space, based on the position coordinates calculated based on the respective base data 40. In this embodiment, motion data describing a motion of the target user 46 in the 3D space is produced based on the 3D position coordinates of the representative points of the respective elements 60 included in the target user 46, calculated based on the respective base data 40. More specifically, motion data describing a motion of the right hand in the 3D space is produced by combining, for example, a series of right hand $n^{th}$ 3D position coordinates $(x_n, y_n, z_n)$, such as the right hand first 3D position coordinates $(x_1, y_1, z_1)$, the right hand second 3D position coordinates $(x_2, y_2, z_2)$, and so forth.

Figure 8:
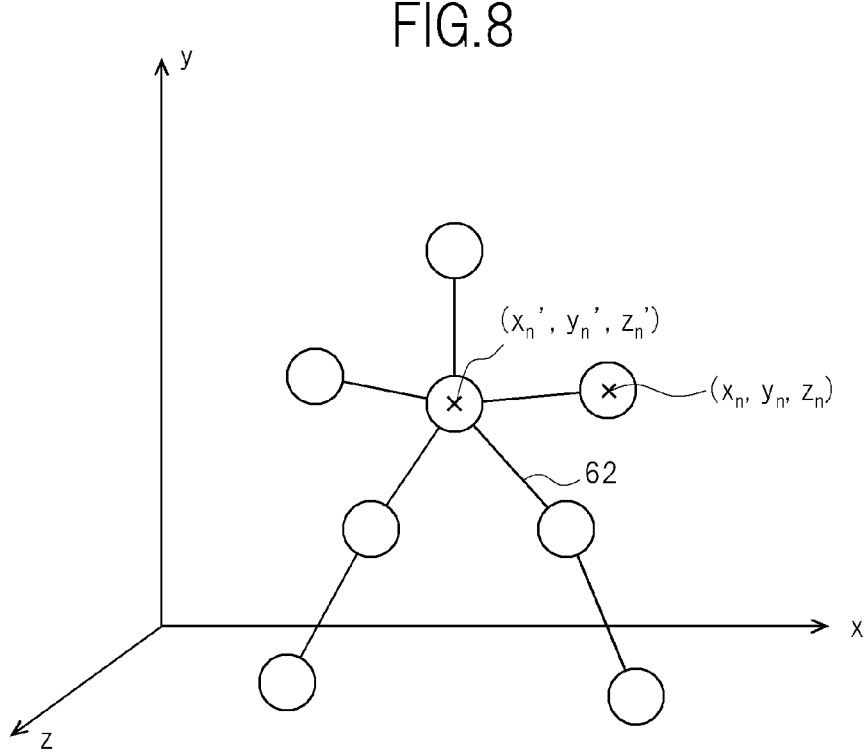
FIG. 8 is a diagram showing one example of wire frame model data.

Note that the motion data producing unit 58 may produce wire frame model data 62 of the target user 46, such as is shown in FIG. 8, using connection relationship data describing connection relationship between the elements 60, stored in advance in the storage unit 22 of the information processing device 2. That is, as described above, combining the motion data describing motions of the respective elements produces motion data describing, e.g., a person walking.

In the first embodiment, motion data is produced based on a series of 3D position coordinates. Therefore, according to the information processing device 2 according to the first embodiment, it is possible to produce motion data that simulates a 3D motion of a moving object.

Figure 9:
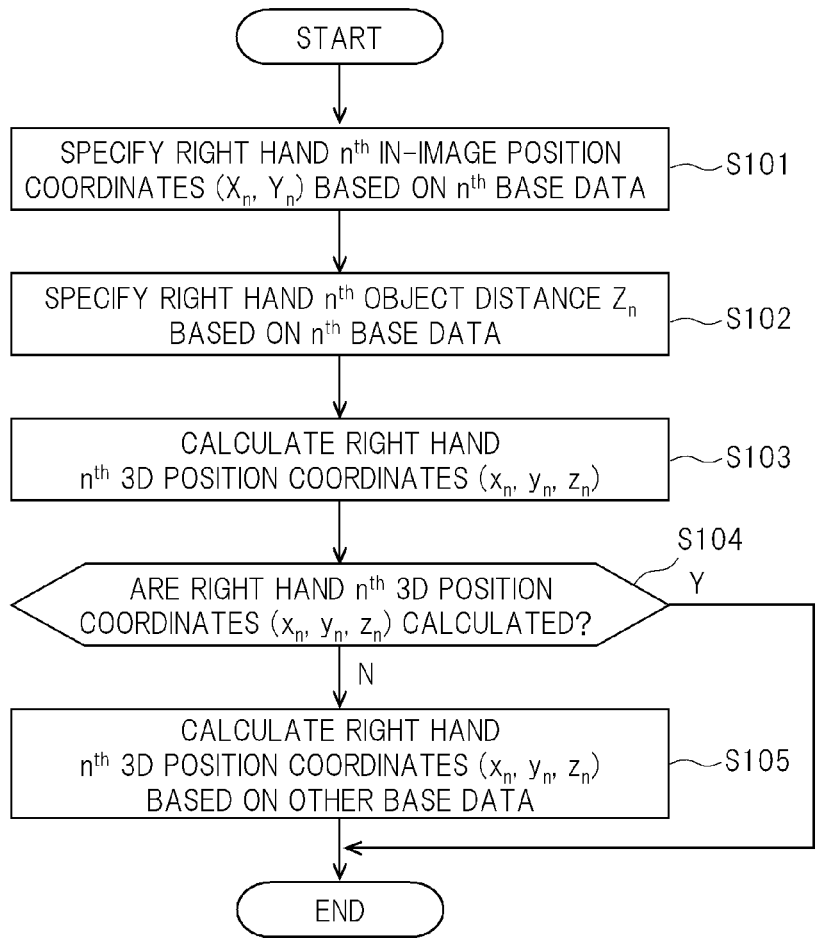
FIG. 9 is a diagram showing one example of a flow of a process carried out in an information processing device according to the first embodiment of the present invention.

In the following, a flow of a process of calculating the $n^{th}$ 3D position coordinates $(x_n, y_n, z_n)$ in the 3D space, of the right hand element 60a included in the target user 46, based on the $n^{th}$ base data 40-n obtained by the base data obtaining unit 50 of the information processing device 2 according to the first embodiment will be described with reference to the flowchart shown in FIG. 9.

Initially, the in-image position specifying unit 52 specifies the right hand $n^{th}$ in-image position coordinates $(x_n, Y_n)$, based on the $n^{th}$ user image 42-n contained in the $n^{th}$ base data 40-n (S101).

Then, the distance specifying unit 54 specifies the right hand $n^{th}$ object distance $Z_n$ correlated to the right hand $n^{th}$ in-image position coordinates $(X_n, Y_n)$ and indicated by the distance data 44 contained in the base data 40 (S102).

Then, the position coordinate calculating unit 56 calculates the right hand $n^{th}$ 3D position coordinates $(x_n, y_n, z_n,)$, based on the right hand $n^{th}$ in-image position coordinates $(X_n, Y_n)$ and the right hand $n^{th}$ object distance Zn (S103).

Then, the position coordinate calculating unit 56 determines whether or not the right hand $n^{th}$ 3D position coordinates $(x_n, y_n, z_n,)$ have been calculated in the process at S103 (S104). With the right hand $n^{th}$ 3D position coordinates $(x_n, y_n, z_n)$ calculated (S104: Y), this process is terminated.

Figure 4A:
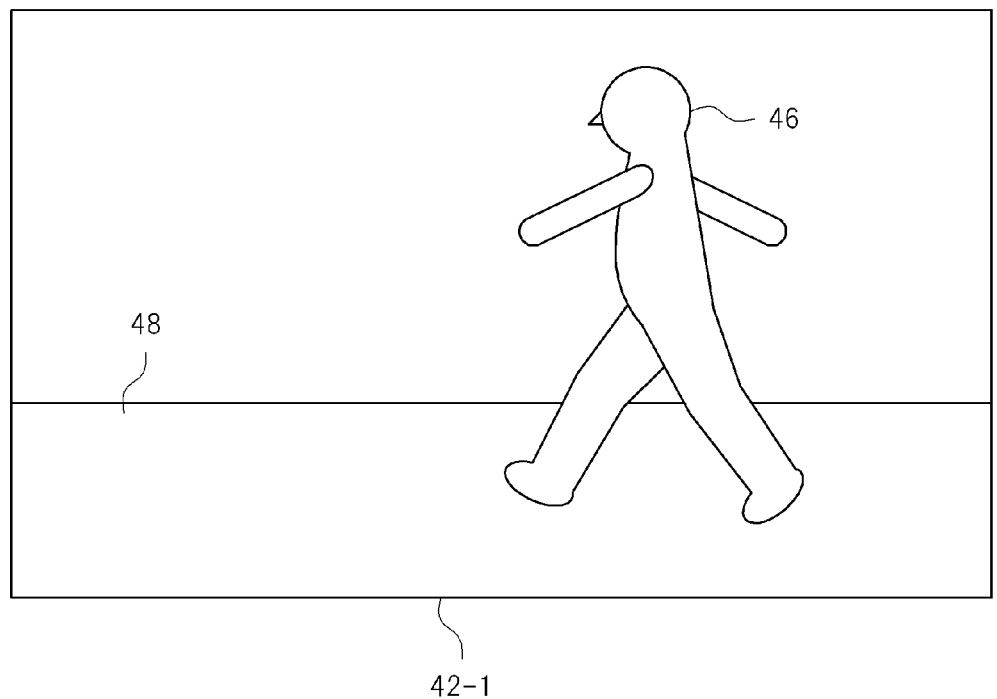
FIG. 4A is a diagram showing one example of a first user image.
Figure 4B:
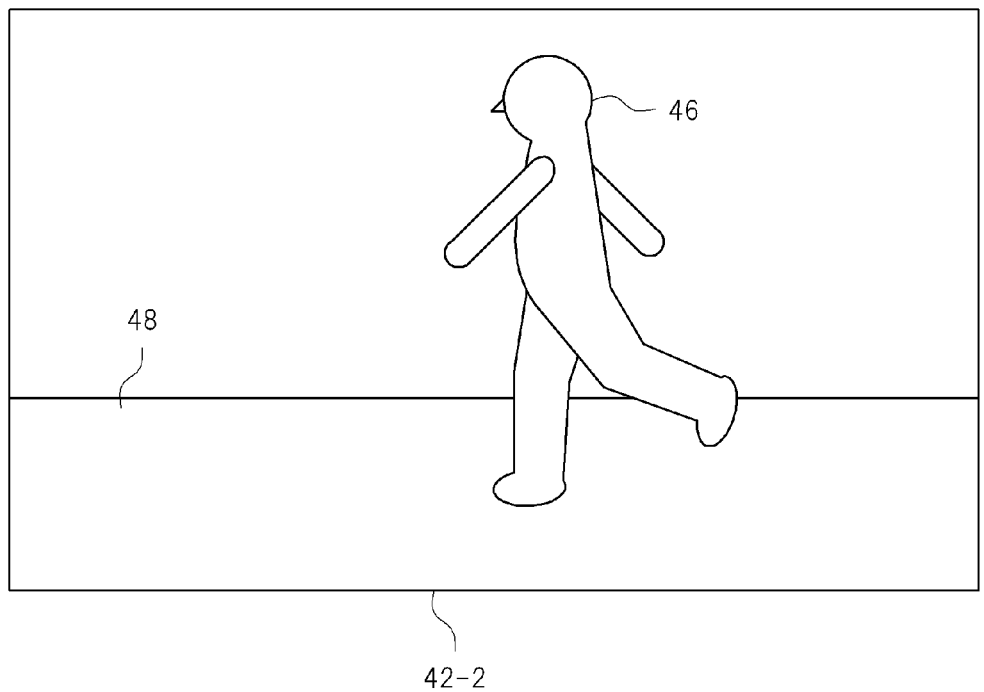
FIG. 4B is a diagram showing one example of a second user image.
Figure 4C:
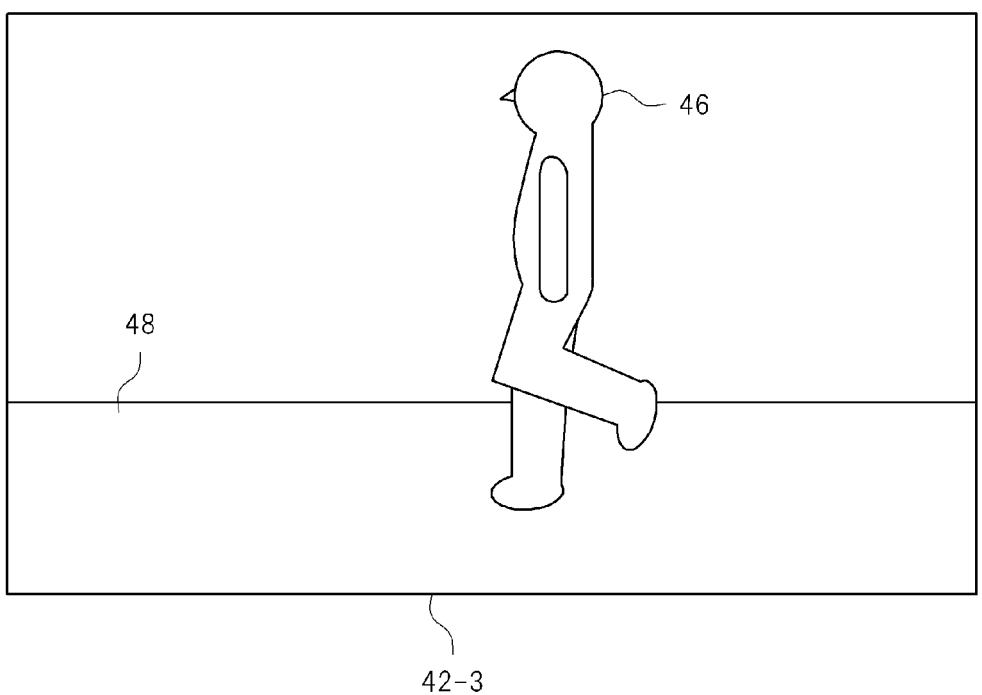
FIG. 4C is a diagram showing one example of a third user image.
Figure 4D:
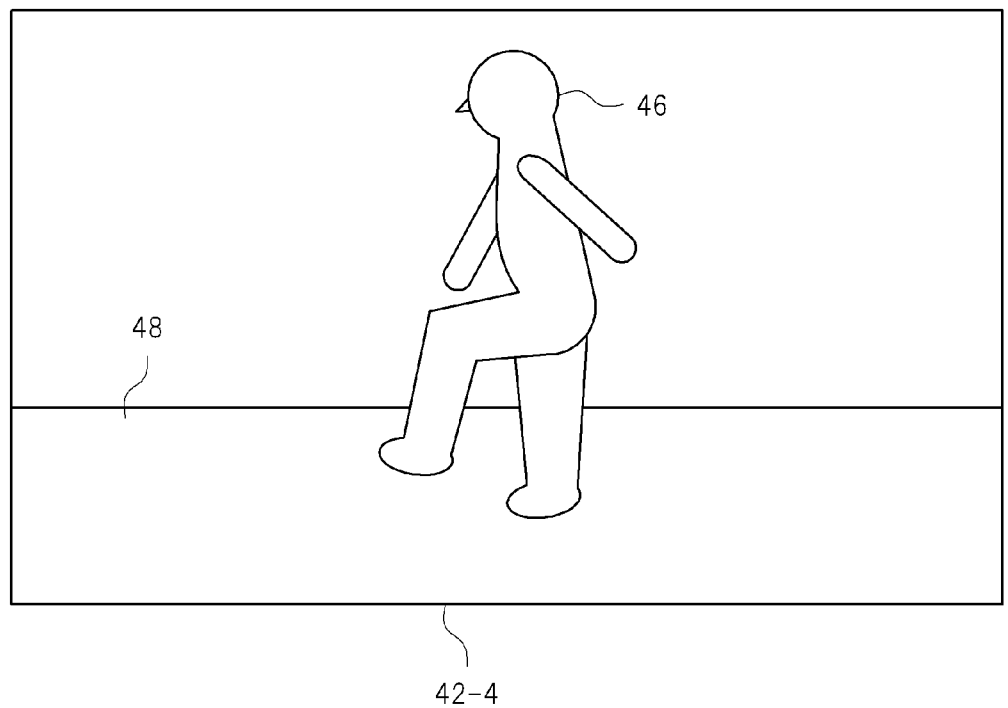
FIG. 4D is a diagram showing one example of a fourth user image.
Figure 4E:
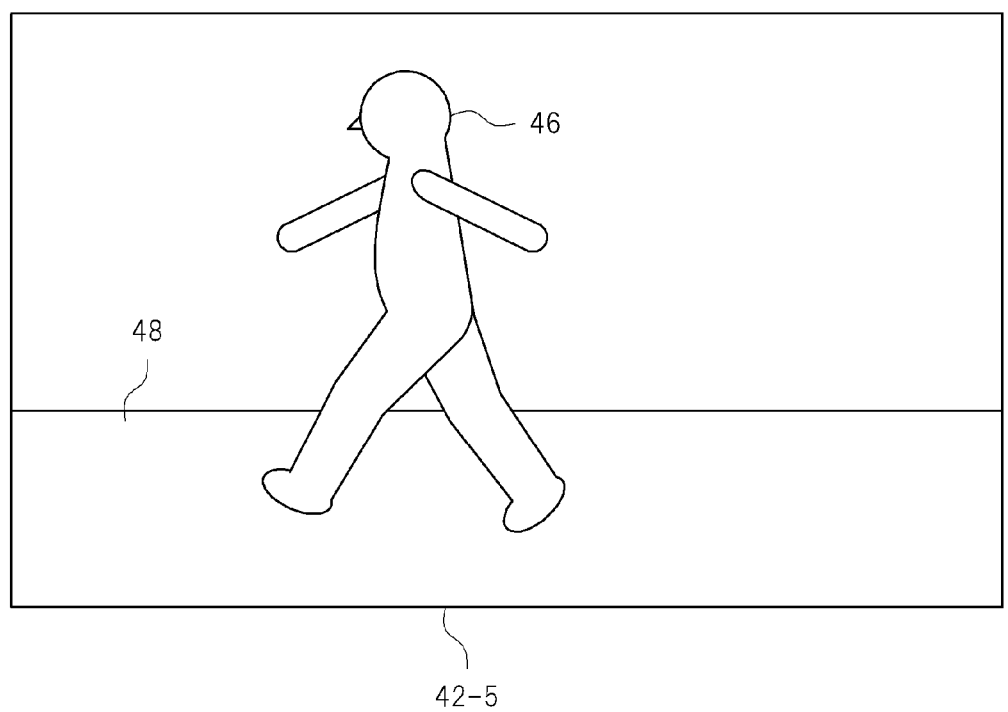
FIG. 4E is a diagram showing one example of a fifth user image.

In the above, there is a case, for example, in which the in-image position specifying unit 52 cannot specify the right hand $n^{th}$ in-image position coordinates $(X_n, Y_n)$, based on the $n^{th}$ user image 42-n. Specifically, there is a case, for example, in which the in-image position specifying unit 52 cannot specify the right hand third in-image position coordinates $(X_3, Y_3)$, based on the $n^{th}$ user image 42-3 as the right hand element 60a is hidden by the target user 46, as shown in FIG. 4C. Further, there is a case in which the distance specifying unit 54 cannot specify the right hand $n^{th}$ object distance $Z_n$, based on the $n^{th}$ distance data 44-n. In these cases, the right hand $n^{th}$ 3D position coordinates $(x_n, y_n, z_n)$ are not calculated based on the $n^{th}$ base data 40-n in the process at S104.

That is, when the right hand $n^{th}$ 3D position coordinates $(x_n, y_n, z_n)$ are not calculated in the process at S104, based on the $n^{th}$ base data 40-n (S104: N), as described above, the position coordinate calculating unit 56 calculates the 3D position coordinates of the right hand element 60a, based on the base data 40 different from the $n^{th}$ base data 40-n among the plurality of base data 40 obtained by the base data obtaining unit 50 (S105).

Figure 10:
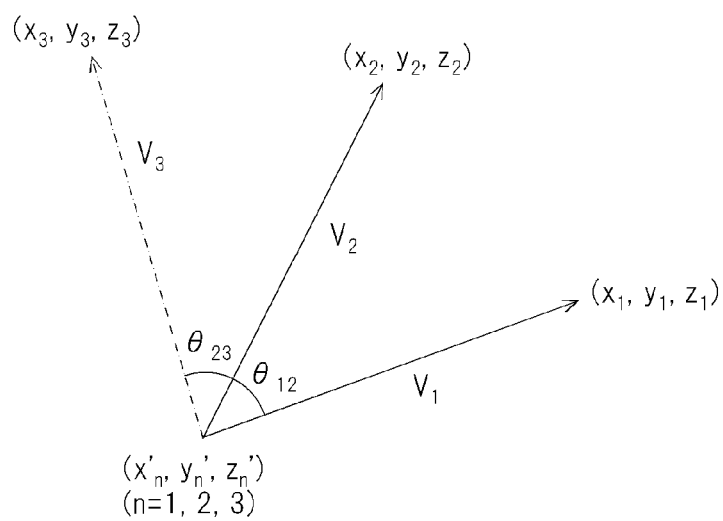
FIG. 10 is a diagram showing one example of a calculation method for third 3D position coordinates.

Specifically, for example, the position coordinate calculating unit 56 may calculate the $n^{th}$ 3D position coordinates $(x_n, y_n, z_n)$ of the right hand element 60a, which are not calculated in the process at S104, using a vector $V_n$ directed from the 3D position coordinates of the element 60 representing the body (a body element 60b) (body $n^{th}$ 3D position coordinates $(x_n',$ $y_n', z_n')$) to the right hand $n^{th}$ 3D position coordinates $(x_n, y_n, z_n)$. FIG. 10 shows one example of a method for calculating the third 3D position coordinates $(x_3, y_3, z_3)$ by the position coordinate calculating unit 56, using the vector $V_n$. For example, the position coordinate calculating unit 56 calculates the value of the right hand third vector $V_3$, based on the angle $theta_{12}$ formed by the right hand first vector $V_1$ and the right hand second vector $V_2$ such that the angle $theta_{23}$ formed by the right hand second vector $V_2$ and the right hand third vector $V_3$ becomes equal to the angle $theta_{12}$ ($theta_{12}$=$theta_{23}$), that the norm $|V_2|$ of the right hand second vector $V_2$ becomes equal to the norm $|V_3|$ of the right hand third vector $V_3$ ($|V_2|=|V_3|$), and that the right hand first vector $V_1$, the right hand second vector $V_2$, and the right hand third vector $V_3$ are on the same plane. Then, the position coordinate calculating unit 56 calculates the right hand third 3D position coordinates $(x_3, y_3, z_3)$, based on the vector sum of the position vector at the body third 3D position coordinates $(x_3', y_3', z_3')$ and the right hand third vector $V_3$.

Note that the method for calculating the right hand $n^{th}$ 3D position coordinates $(x_n, y_n, z_n)$ in the process at S105 is not limited to the above described method. For example, the position coordinate calculating unit 56 may calculate the third 3D position coordinates $(x_3, y_3, z_3)$, based on the vector sum of the vector $(x_2-x_1, y_2-y_1, z_2-z_1)$ directed from the first 3D position coordinates $(x_1, y_1, z_1)$ to the second 3D position coordinates $(x_2, y_2, z_2)$ and the position vector at the second 3D position coordinates $(x_2, y_2, z_2)$, $((x_3, y_3, z_3)=(2x_2-x_1, 2y_2-y_1, 2z_2-z_1))$.

Alternatively, the position coordinate calculating unit 56 may calculate the right hand third 3D position coordinates $(x_3, y_3, z_3)$, base on, e.g., the right hand second 3D position coordinates $(x_2, y_2, z_2)$ and the right hand fourth 3D position coordinates $(x_4, y_4, z_4)$. Specifically, for example, the midpoint between the right hand second 3D position coordinates $(x_2, y_2, z_2)$ and the right hand fourth 3D position coordinates $(x_4, y_4, z_4)$ may be determined as the right hand third 3D position coordinates $(x_3, y_3, z_3)$.

As described above, when the position coordinates of a missing element among the plurality of elements included a moving object are not calculated based on the $n^{th}$ base data 40-n by the position coordinate calculating unit 56, as described above (see S104), the position coordinate calculating unit 56 may calculate the position coordinates of the missing element, based on the base data 40 different from the $n^{th}$ base data 40-n among the plurality of base data 40 obtained by the base data obtaining unit 50 (see S105). Alternatively, the position coordinate calculating unit 56 may calculate the 3D position coordinates of the missing element, based on a difference in the 3D position coordinates.

Further, when it is determined in the process at S104 that the right hand third 3D position coordinates $(x_3, y_3, z_3)$ and the right hand fourth 3D position coordinates $(x_4, y_4, z_4)$ are not calculated, the position coordinate calculating unit 56 may calculate in the process at S105 the right hand third 3D position coordinates $(x_3, y_3, z_3)$ and the right hand fourth 3D position coordinates $(x_4, y_4, z_4)$, based on the right hand second 3D position coordinates $(x_2, y_2, z_2)$ and the right hand fifth 3D position coordinates $(x_5, y_5, z_5)$. That is, when a situation in which the position coordinates of a missing element are not calculated lasts from, e.g., time t1 to time t2, as described above, the position coordinate calculating unit 56 may calculate the position coordinates of the missing element, based on the position coordinates of the missing element last calculated before the time t1 and the position coordinates of the missing element first calculated after the time t2.

When the 3D position coordinates are not specified even in the process at S105, the control unit 21 of the information processing device 2 may instruct the UI unit 24, such as a speaker, of the information processing device 2 to output an alarm sound. For a portable game device 3 having a speaker, the control unit 21 of the information processing device 2 may instruct via the communication unit 23 of the information processing device 2 the speaker of the portable game device 3 to output an alarm sound.

Note that while a process example of calculating the right hand $n^{th}$ 3D position coordinates $(x_n, y_n, z_n)$ is described in the above, obviously, the 3D position coordinates of an element 60 other than the right hand element 60a may be calculated using a similar method.

As described above, in the first embodiment, the 3D position coordinates of a moving object in each frame are calculated based on the user image 42 produced by the image capturing unit 36 of the portable game device 3 and the distance data 44 produced by the distance measuring unit 37 of the portable game device 3. Then, motion data is produced based on the series of 3D position coordinates. This makes it possible to reduce a user operation required in production of motion data by simulating a 3D motion of the moving object.

Further, in a case where the $n^{th}$ 3D position coordinates cannot be calculated based only on the $n^{th}$ base data 40-n but calculated based on position coordinates calculated based on other base data 40, it is possible to utilize the information relating to the 3D position coordinates calculated based on the other base data 40. This can enhance accuracy of the $n^{th}$ 3D position coordinate calculated.

Note that the present invention is not limited to the above-described embodiment.

Figure 11:
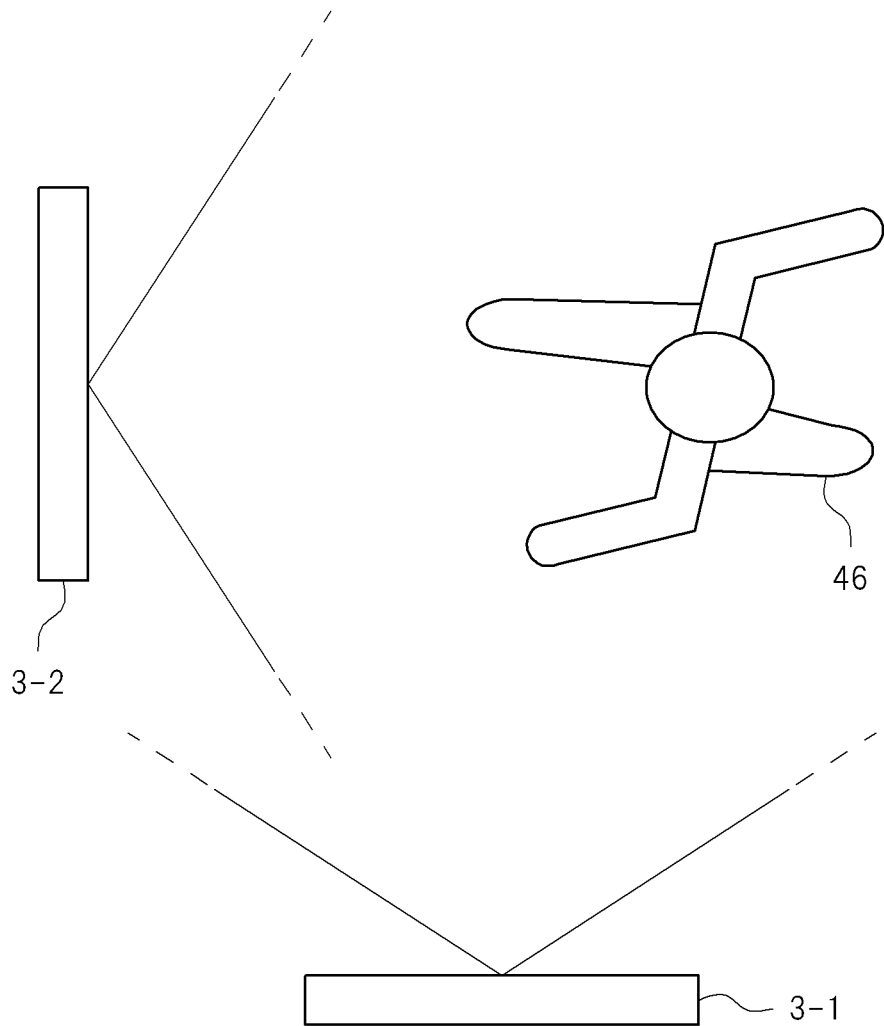
FIG. 11 is a diagram showing one example of a situation in which an image of a user is captured, using two or more portable game devices.

For example, as shown in FIG. 11, an image of a moving object, such as the target user 46, may be captured, using the image capturing units 36 of two or more portable game devices 3 (a first portable game device 3-1 and a second portable game device 3-2) at coordinated timing; the distance measuring unit 37 of the first portable game device 3-1 may measure the distance between the first portable game device 3-1 and the moving object, such as the target user 46; and the distance measuring unit 37 of the second portable game device 3-2 may measure the distance between the second portable game device 3-2 and the moving object, such as the target user 46. In the above, the position coordinate calculating unit 56 may calculate 3D position coordinates, based on a combination of the base data 40 sent from the respective portable game devices 3.

Specifically, for example, initially, a user image 42 produced by capturing in advance an image of the target user 46, using the image capturing unit 36 of the first portable game device 3-1 is shown on the display unit 34 of the first portable game device 3-1, and then, a user designates the position of an element 60 (e.g., the right hand element 60a) in the user image 42, using the operating unit 35 of the first portable game device 3-1. Further, the control unit 31 of the first portable game device 3-1 obtains the data indicating the position designated by the user. Meanwhile, a user image 42 obtained by capturing in advance an image of the target user 46, using the image capturing unit 36 of the second portable game device 3-2 is shown on the display unit 34 of the second portable game device 3-2, and then, a user designates the position of the element (e.g., the right hand element 60a) in the user image 42, using the operating unit 35 of the second portable game device 3-2. Further, the control unit 31 of the second portable game device 3-2 obtains the data indicating the position designated by the user. After the positions of corresponding elements 60 are designated in advance in the respective portable game devices 3, as described above, an image of the target user 46 moving is captured using the respective image capturing units 36 of the respective portable game devices 3 to produce a series of user images 42, and the respective distance measuring units 37 of the respective portable game devices 3 produce a series of distance data 44. Then, the respective portable game devices 3 produce base data 40 that contains the user image 42 and the distance data 44, and send to the information processing device 2. The information processing device 2 receives the base data 40 sent from the respective portable game devices 3, and the position coordinate calculating unit 56 calculates 3D position coordinates, based on the combination of these base data 40.

With the above, it is possible to reduce a case in which the $n^{th}$ 3D position coordinates are calculated based on base data 40 different form the $n^{th}$ base data 40, as is carried out in the process at S105 of the above described process example, as there is a case in which an element 60 not shown in a user image 42 produced using one portable game device 3 is shown in a user image 42 produced using the other portable game device 3.

Note that each of the portable game devices 3 may send data indicating a position where the portable game device 3 is placed, together with the base data 40, to the information processing device 2. With this arrangement, it is possible to calculate the 3D position coordinates of each element 60, based on the data indicating the positions of the respective portable game devices 3.

Further, for example, the information processing system 1 may include a video camera having an image capturing function and a distance measuring function, instead of the portable game device 3. That is, a video camera having an image capturing function and a distance measuring function may be used instead of the portable game device 3.

Further, the above-described information processing device 2 and the portable game device 3 may be mounted in a single housing.

In the following, an example of utilizing the motion data produced as described above is described.

For example, the produced motion data may be uploaded from the communication unit 23 of the information processing device 2 to a server (not shown) connected via a network, such as the Internet. In the above, a user may upload the motion data so as to be correlated to attribute data, such as data indicating a game title that uses the motion data, data indicating a creator of the motion data, data indicating a CG character created based on the motion data, and so forth. In the server, the motion data may be stored so as to be correlated to the attribute data. The motion data may be converted into data described in an existent script language before being stored in the server.

It may be arranged such that a user can view the motion data stored in the server, using, e.g., a browser or the like. In the above, the motion data may be categorically shown. Further, the motion data may be shown as an icon. Specifically, for example, the motion data may be expressed on a browser by means of a wire frame or as a motion of a character or the like.

A user who uploads the motion data may set a user to which the motion data is to be disclosed so that only the set user can view the motion data.

The motion data to be viewed may be hyperlinked to a network store of motion data so that a user can purchase the motion data by clicking the hyperlink.

Further, the information processing device 2 may serially download newly uploaded motion data in a server via a network to cache in the storage unit 22 of the information processing device 2. For example, the motion data may be stored in the storage unit 22 of the information processing device 2 together with save data of a game.

Further, for example, the information processing device 2 may compare motion data expressing a person dancing or swinging for golf, stored in the server, and motion data produced based on a series of user images 42 captured, using the image capturing unit 36 of the portable game device 3, and calculates a point based on an extent of correspondence of the respective motion data.

[Second Embodiment]

In the following, another embodiment, or a second embodiment, of the present invention will be described mainly about features thereof different from those of the first embodiment, and a description of those similar to those of the first embodiment is not repeated here.

FIG. 1 is also a diagram showing one example of a hardware structure of an information processing system 1 according to the second embodiment. A hardware structure of the information processing system 1 according to the second embodiment is not described here as being similar to that in the first embodiment. FIG. 2 is also a perspective view showing one example of the portable game device 3 according to the second embodiment. The shape and the hardware structure of the housing 30 of the portable game device 3 according to the second embodiment are similar to those in the first embodiment, and a description thereof is not repeated here.

Figure 12:
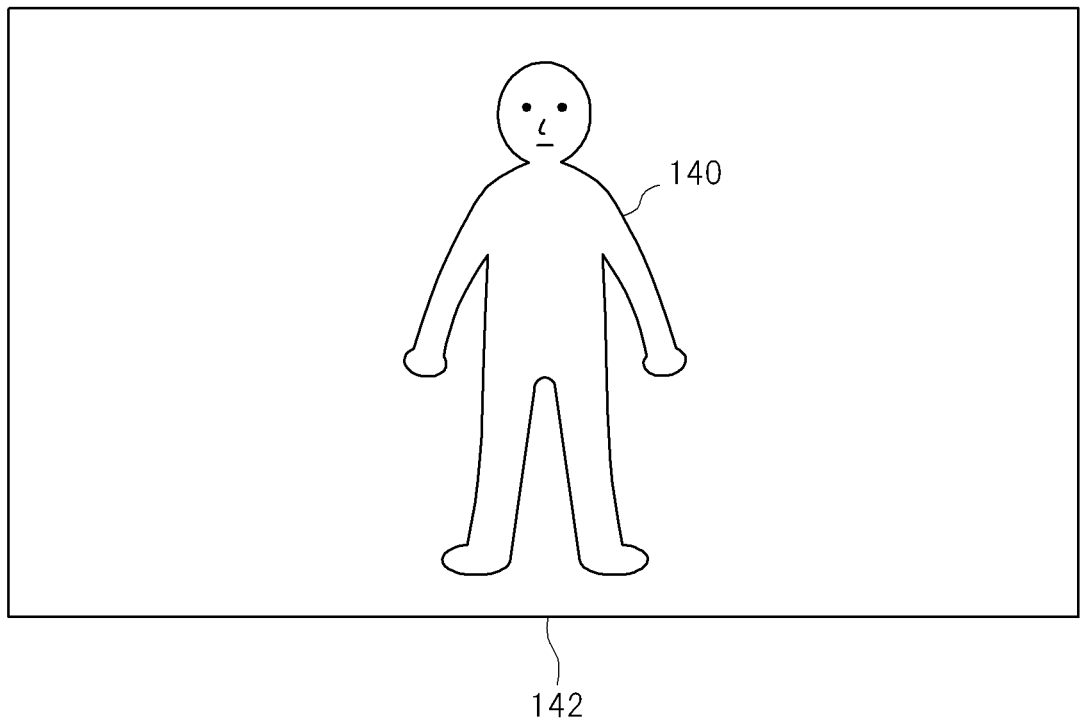
FIG. 12 is a diagram showing one example of a user image.

In the second embodiment, the image capturing unit 36 of the portable game device 3 captures an image of a target user 140 moving every predetermined period of time (e.g., 1/60th of a second) to thereby sequentially produce a user image 142 (a frame image) (see FIG. 12). The sequentially produced user image 142 is given a frame ID 144, or a frame identifier (see FIG. 13). FIG. 12 shows one example of the user image 142 sequentially produced. Note that the target user 140 is a mere example of a moving object, and the image capturing unit 36 may capture an image of a moving object moving other than the target user 140 to produce an image of the moving object.

Figure 13:
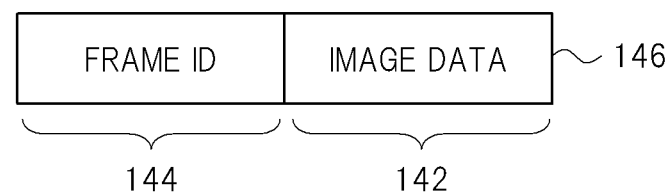
FIG. 13 is a diagram showing one example of a data structure of image data.

The communication unit 33 of the portable game device 3 sends image data 146 that contains mutually correlated frame ID 144 and user image 142 to the information processing device 2, and the communication unit 23 of the information processing device 2 receives the image data 146. FIG. 13 shows one example of a data structure of the image data 146.

Figure 14:
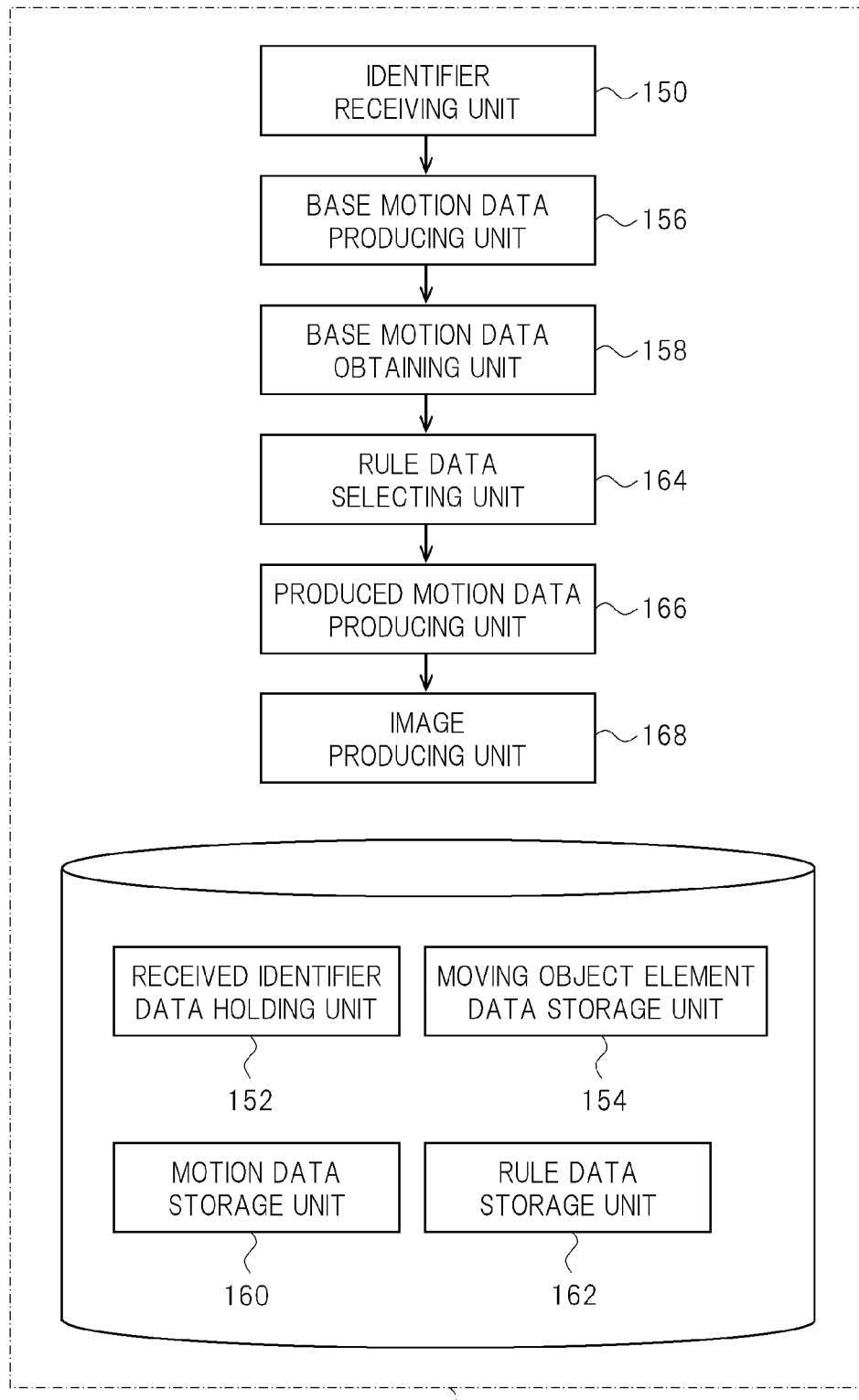
FIG. 14 is a functional block diagram of an information processing device according to a second embodiment of the present invention.

In the following, functions realized in the information processing device 2 according to the second embodiment will be described. FIG. 14 is a functional block diagram of the information processing device 2 according to the second embodiment. As shown in FIG. 14, the information processing device 2 according to the second embodiment functionally comprises an identifier receiving unit 150, a received identifier data holding unit 152, a moving object element data storage unit 154, a base motion data producing unit 156, a base motion data obtaining unit 158, a motion data storage unit 160, a rule data storage unit 162, a rule data selecting unit 164, a produced motion data producing unit 166, and an image producing unit 168. The identifier receiving unit 150, the base motion data producing unit 156, the base motion data obtaining unit 158, the rule data selecting unit 164, the produced motion data producing unit 166, and the image producing unit 168 are realized mainly using the control unit 21 of the information processing device 2, while the received identifier data holding unit 152, the moving object element data storage unit 154, the motion data storage unit 160, and the rule data storage unit 162 are realized mainly using the storage unit 22 of the information processing device 2. These components are realized by executing a program installed in the information processing device 2, which is a computer, by the control unit 21, such as a CPU, included in the information processing device 2. The program is supplied to the information processing device 2 via a computer readable information transmitting medium, such as, e.g., a CD-ROM, a DVD-ROM, and so forth, or a communication network, such as the Internet or the like.

Figure 15:
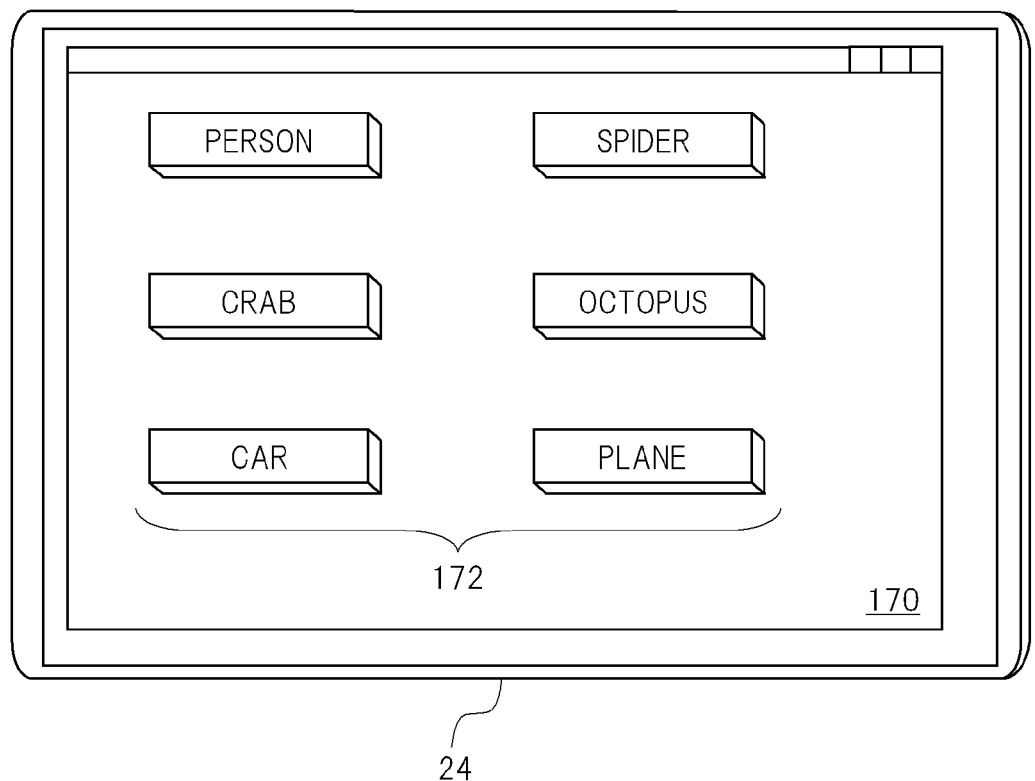
FIG. 15 is a diagram showing one example of a first moving object selection screen image.

The identifier receiving unit 150 receives the identifier of a moving object. Specifically, in the second embodiment, the identifier receiving unit 150 outputs a moving object selection screen image 170 (a first moving object selection screen image), such as is shown in FIG. 15, to the UI unit 24, such as a display, of the information processing device 2 to display thereon. The moving object selection screen image 170 includes a plurality of moving object name buttons 172 shown therein each being labeled by a kind of a moving object. Each of the moving object name buttons 172 is correlated to a moving object ID 174, or the identifier of the moving object (see FIG. 16). Then, when a user clicks any moving object name button 172 (e.g., a moving object name button 172 labeled as "person"), the identifier receiving unit 150 obtains the moving object ID 174 (e.g., "1") correlated to the moving object name button 172 clicked, and then sets the number of the obtained moving object ID 174 as the number of the first moving object ID 174-1 contained in the received identifier data 176 (see FIG. 16). Thereafter, the identifier receiving unit 150 outputs a moving object selection screen image 170 (a second moving object selection screen image (not shown)) having a similar screen image structure to that of the moving object selection screen image 170 shown in FIG. 15 to the UI unit 24, such as a display, of the information processing device 2 to display thereon. Then, when a user clicks any moving object name button 172 (e.g., a moving object name button 172 labeled as "spider"), the identifier receiving unit 150 obtains the moving object ID 174 (e.g., "2") correlated to the moving object name button 172 clicked, and sets the number of the obtained moving object ID 174 as the number of the second moving object ID 174-2 contained in the received identifier data 176 (see FIG. 16).

Figure 16:
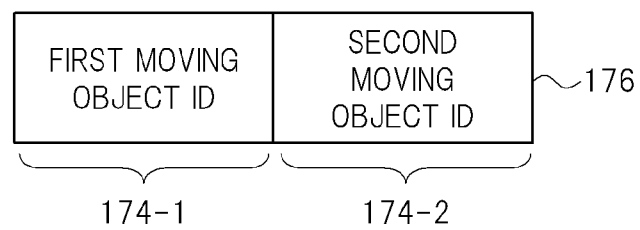
FIG. 16 is a diagram showing one example of a data structure of received identifier data.

FIG. 16 is a diagram showing one example of a data structure of the received identifier data 176. As shown in FIG. 16, the received identifier data 176 contains a first moving object ID 174-1 and a second moving object ID 174-2. The received identifier data holding unit 152 holds the received identifier data 176. Specifically, the received identifier data holding unit 152 holds the received identifier data that contains, e.g., the first moving object ID 174-1 having the number "1" and the second moving object ID 174-2 having the number "2".

Figure 17:
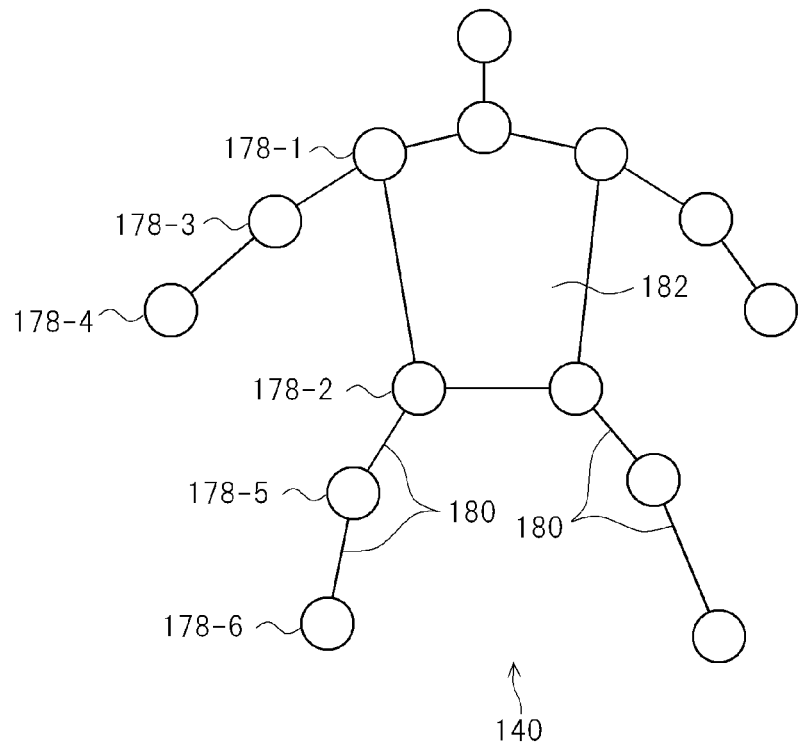
FIG. 17 is a diagram showing one example of respective elements included in a target user.
Figure 18:
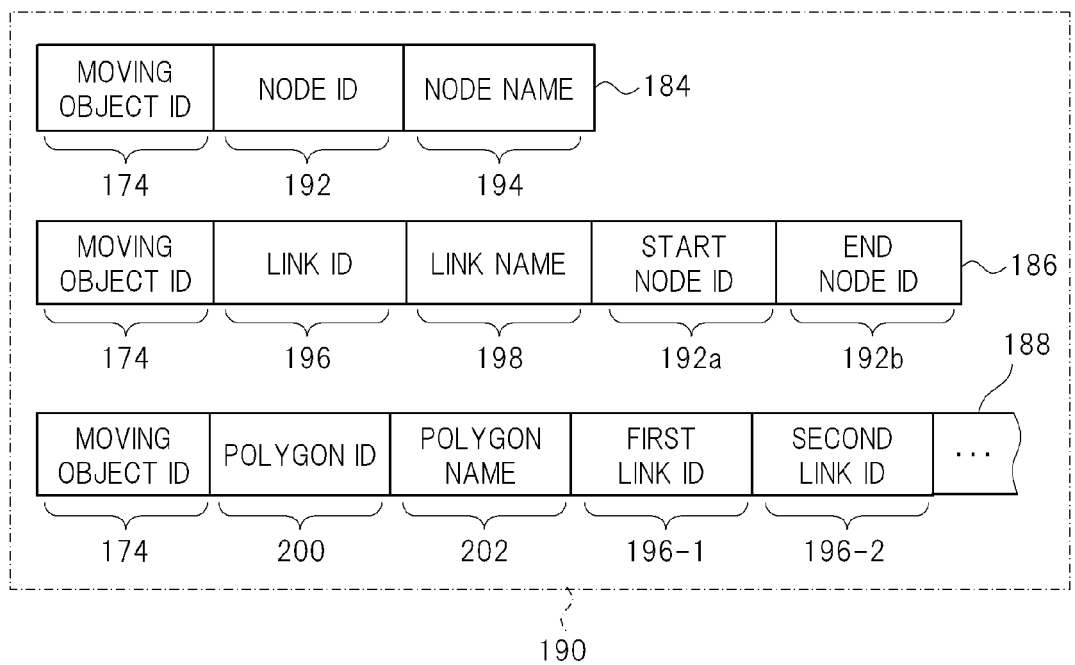
FIG. 18 is a diagram showing one example of a data structure of a moving object element data.

In the second embodiment, as shown in FIG. 17, the target user 140 includes a plurality of node elements 178, such as, e.g., a right shoulder node element 178-1, a right hip node element 178-2, a right elbow node element 178-3, a right hand node element 178-4, a right knee node element 178-5, a right foot node element 178-6, and so forth. In addition, the target user 140 includes a link element 180 for connecting these node elements 178 and a polygon element 182 formed using a plurality of link elements 180. FIG. 17 is a diagram showing one example of the respective elements included in the target user 140. That is, a moving object may include a plurality of elements, as described above.

In the second embodiment, the moving object element data storage unit 154 stores moving object element data 190 that contains node data 184 relating to each node element 178, link data 186 relating to each link element 180, and polygon data 188 relating to each polygon element 182. That is, the moving object element data storage unit 154 stores a plurality of moving object element data 190 relating to each of the elements included in a moving object, as described above.

Specifically, the node data 184 contains a moving object ID 174, a node ID 192 that is the identifier of a node element 178, and a node name 194 describing the name of the node element 178. The link data 186 includes a moving object ID 174, a link ID 196 that is the identifier of a link element 180, a link name 198 describing the name of the link element 180, a start node ID 192a that is the identifier of a node element 178 that is the start point of the link element 180, and an end node ID 192b that is the identifier of a node element 178 that is the end point of the link element 180. The polygon data 188 includes a moving object ID 174, a polygon ID 200 that is the identifier of a polygon element 182, a polygon name 202 describing the name of the polygon element 182, and a plurality of link ID's 196 (a first link ID 196-1, a second link ID 196-2, and so forth). Note that the plurality of link ID's 196 contained in the polygon data 188 indicate the link elements 180 constituting the polygon element 182 identified by the polygon ID 200. In the second embodiment, the moving object element data 190 additionally describes connection relationship between the elements.

Figure 19:
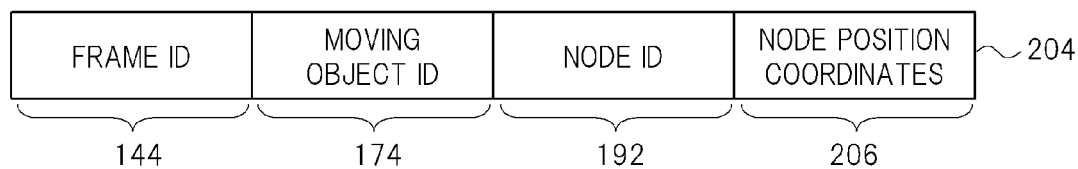
FIG. 19 is a diagram showing one example of a data structure of motion data.

Based on an image sent from the portable game device 3, the base motion data producing unit 156 produces motion data 204 (base motion data) describing a motion of a predetermined moving object (see FIG. 19). Specifically, for example, based on the respective user images 142 sent from the portable game device 3 and using, e.g., a pattern recognition technique, the base motion data producing unit 156 specifies the position coordinates of the respective elements corresponding to the first moving object ID 174-1 contained in the received identifier data 176 held in the received identifier data holding unit 152. Note that, in the second embodiment, specification of the position coordinates of the node element 178 included in the target user 140 leads to specification of the position coordinates of all of the elements included in the target user 140, based on the connection relationship between the elements indicated by the moving object element data 190.

In the above, the base motion data producing unit 156 may specify the position coordinates of the respective elements, based on the colors of the respective pixels in the user image 142. Further, the base motion data producing unit 156 may specify the position coordinates of the respective elements in the user image 142, using an existent optical motion capturing technique, or the like. Still further, the user image 142 maybe shown on the UI unit 24, such as a display, of the information processing device 2; position information input by a user, using the UI unit, such as a mouse, may be obtained; and the position coordinates of the respective elements may be specified based on the position information obtained.

In the second embodiment, the base motion data producing unit 156 produces motion data 204 (base motion data), shown in FIG. 19, that contains the frame ID 144 correlated to the user image 142, the moving object ID 174, the node ID 192 correlated to each node element 178 (the node element 178 included in the target user 140 in the second embodiment), node position coordinates 206 indicating the position coordinates of the node element 178, specified by the base motion data producing unit 156. Specifically, in the second embodiment, the base motion data producing unit 156 sets the number (e.g., "1") of the first moving object ID 174-1 contained in the received identifier data 176 as the number of the moving object ID 174 contained in the motion data 204. As described above, in the second embodiment, the motion data 204 indicates the position coordinates of each element included in a moving object in each frame. Therefore, by combining the motion data 204 correlated to a predetermined moving object ID 174 in an order according to the frame ID 144, a motion of each element included in the moving object can be expressed.

Note that, based on the image of the moving object identified by the moving object ID 174 and stored in advance in the storage unit 22 of the information processing device 2 so as to be correlated to the moving object ID 174, the base motion data producing unit 156 may specify the position coordinates of each element, using specifying method data indicating a method for specifying position coordinates of each element included in the moving object.

The base motion data obtaining unit 158 obtains the motion data 204 (base motion data) describing a motion of a predetermined moving object. In the second embodiment, the base motion data obtaining unit 158 obtains the motion data 204 produced by the base motion data producing unit 156, and outputs to the motion data storage unit 160.

The motion data storage unit 160 stores the motion data 204 (base motion data) obtained by the base motion data obtaining unit 158.

Figure 20:
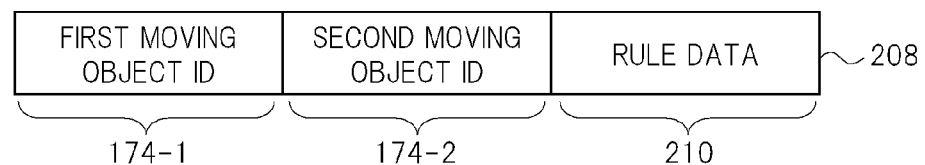
FIG. 20 is a diagram showing one example of a data structure of moving object correspondence management data.

The rule data storage unit 162 stores a plurality of rule data 210 so as to be each correlated to the identifier of a moving object, the rule data 210 defining a rule for determining a motion of the moving object identified by the identifier, based on a motion of a predetermined moving object (see FIG. 20). In the second embodiment, the rule data storage unit 162 stores a plurality of moving object correspondence management data 208, shown in FIG. 20, each including a first moving object ID 174-1 that is an identifier of a first moving object (e.g., a "person" in the second embodiment), a second moving object ID 174-2 that is an identifier of a second moving object (e.g., a "spider" in the second embodiment) different from the moving object identified by the first moving object ID 174-1, and rule data 210 defining a rule for determining a motion of the moving object identified by the second moving object ID 174-2, based on a motion of the moving object identified by the fist moving object ID 174-1.

Specifically, for example, the rule data 210 defines a rule for calculating the position coordinates (e.g., the node position coordinates 206) of each element included in the moving object identified by the second moving object ID 174-2, based on the position coordinates (e.g., the node position coordinates 206) of each element included in the moving object identified by the first moving object ID 174-1. Details of the rule defined by the rule data 210 will be described later.

The rule data selecting unit 164 selects the rule data 210 that is correlated to an identifier received by the identifier receiving unit 150 from among the plurality of rule data 210 stored in the rule data storage unit 162. In the second embodiment, the rule data selecting unit 164 selects, from among the plurality of moving object correspondence management data 208 stored in the rule data storage unit 162, moving object correspondence management data 208 that contains the first moving object ID 174-1 having a number corresponding to the number (e.g., "1") of the first moving object ID 174-1 contained in the received identifier data 176 held in the received identifier data holding unit 152 and the second moving object ID 174-2 having a number corresponding to the number (e.g., "2") of the second moving object ID 174-2 contained in the received identifier data 176 held in the received identifier data holding unit 152, and then selects the rule data 210 contained in the moving object correspondence management data 208.

The produced motion data producing unit 166 applies the rule defined by the rule data 210 selected by the rule data selecting unit 164 to the motion data 204 (base motion data) describing a motion of the moving object (e.g., a person)

identified by the number (e.g., "1") of the first moving object ID 174-1 contained in the received identifier data 176 held in the received identifier data holding unit 152, the motion data being obtained by the base motion data obtaining unit 158, to thereby produce motion data 204 (produced motion data) describing a motion of the moving object (e.g., a spider) identified by the number (e.g., "2") of the second moving object ID 174-2 contained in the received identifier data 176 held in the received identifier data holding unit 152.

Figure 21:
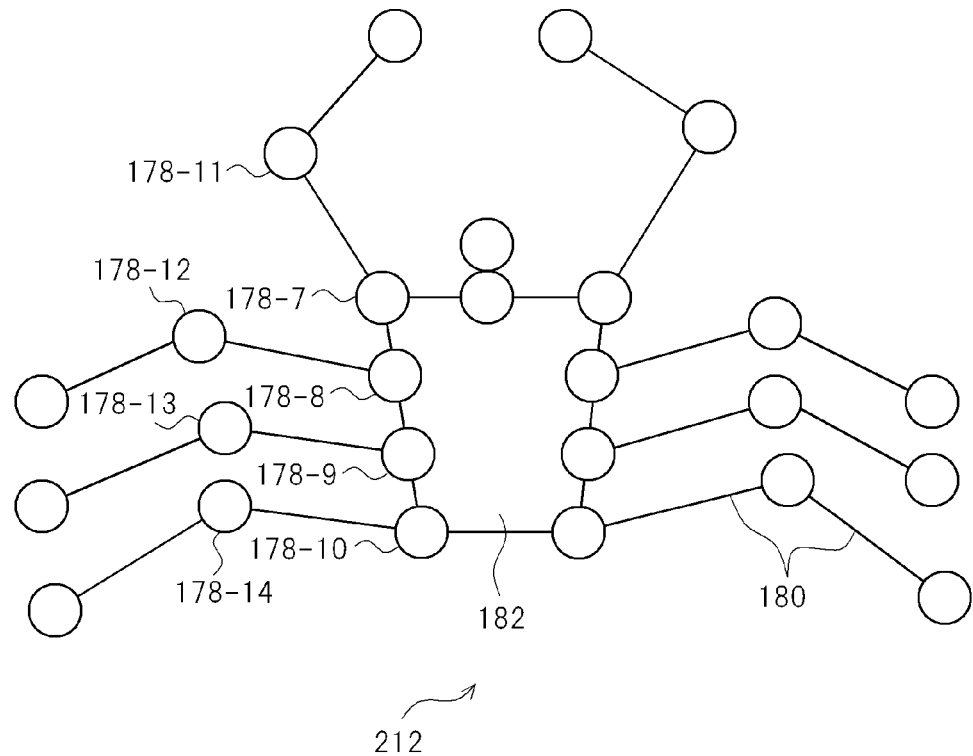
FIG. 21 is a diagram showing one example of respective elements included in a spider object.

FIG. 21 is a diagram showing respective elements included in a spider object 212 produced by applying the rule defined by the rule data 210 to the respective elements included in the target user 140 shown in FIG. 17 by the produced motion data producing unit 166.

In the second embodiment, the spider object 212 includes, e.g., a first right leg root node element 178-7, a second right leg root node element 178-8, a third right leg root node element 178-9, a fourth right leg root node element 178-10, a first right leg joint node element 178-11, a second right leg joint node element 178-12, a third right leg joint node element 178-13, a fourth right leg joint node element 178-14, and so forth.

The spider object 212 additionally includes a link element 180 for connecting these node elements 178 and a polygon element 182 formed using a plurality of link elements 180.

The produced motion data producing unit 166 produces motion data 204 (produced motion data) that contains the frame ID 144 correlated to a user image 142 used as a base of production, the moving object ID 174, the node ID 192 correlated to each node element 178 (the node element 178 included in the spider object 212 in the second embodiment), and the node position coordinates 206 indicating the position coordinates of the node element 178. In the second embodiment, the produced motion data producing unit 166 sets the number (e.g., "2") of the second moving object ID 174-2 contained in the received identifier data 176 as the number of the moving object ID 174 contained in the motion data 204.

The node position coordinates 206 contained in the motion data 204 that contains the moving object ID 174 having the number "2" (hereinafter referred to as second motion data 204-2) are calculated by applying the rule defined by the rule data 210 selected by the rule data selecting unit 164 to the node position coordinates 206 contained in the motion data 204 that contains the moving object ID 174 having the number "1" (hereinafter referred to as first motion data 204-1).

The rule data 210 may define a rule for setting, e.g., the node position coordinates 206 contained in the first motion data 204-1 as the node position coordinates 206 contained in the second motion data 204-2. Specifically, for example, the rule data 210 may define a rule for setting the node position coordinates 206 contained in the first motion data 204-1 corresponding to the right shoulder node element 178-1 as the node position coordinates 206 contained in the second motion data 204-2 corresponding to the first right leg root node element 178-7.

Further, the rule data 210 may define a rule for correlating, e.g., a combination of a plurality of node position coordinates 206 contained in either one of the first motion data 204-1 and the second motion data 204-2 to one node position coordinates 206 contained in the other. Specifically, for example, the rule data 210 may define a rule for setting the position coordinates of a point as node position coordinates 206 contained in the second motion data 204-2 corresponding to the second right leg root node element 178-8, the point dividing into 1:2 the segment connecting the node position coordinates 206 contained in the first motion data 204-1 corresponding to the right shoulder node element 178-1 and the node position coordinates 206 contained in the first motion data 204-1 corresponding to the right hip node element 178-2. With such a rule defined in the rule data 210, even though the number of node elements 178 included in the target user 140 differs from that in the spider object 212, it is possible to calculate the node position coordinates 206 of the respective node elements 178 included in the spider object 212. That is, addition and deletion of the node element 178 is possible in production of the produced motion data, based on the base motion data.

Further, the rule data 210 may define a rule for calculating, e.g., node position coordinates 206 contained in the second motion data 204-2, based on a combination of the node position coordinates 206 contained in a plurality of first motion data 204-1 correlated to a plurality of different respective frame ID's 144. Specifically, for example, the rule data 210 may define a rule for setting the position coordinates of a point as node position coordinates 206 contained in the second motion data 204-2 corresponding to the second right leg joint node element 178-12 and containing the frame ID 144 having the number "3", the point dividing into 1:2 the segment connecting the node position coordinates 206 contained in the first motion data 204-1 corresponding to the right elbow node element 178-3 and containing the frame ID 144 being the number "1" and the node position coordinates 206 contained in the first motion data 204-1 corresponding to the right knee node element 178-5 and containing the frame ID 144 being "2". With such a rule defined in the rule data 210, the produced motion data producing unit 166 can produce produced motion data, while utilizing a difference in the image capturing time of the target users 140. This can reduce unnaturalness of a motion picture (a motion picture comprising a series of spider images 214 (see FIG. 22) in the second embodiment) produced by the image producing unit 168 to be described later.

Further, the rule data 210 may define any rule other than the above described rules. Specifically, for example, the rule data 210 may define a rule for calculating the position coordinates of an element included in a second moving object (e.g., the spider object 212) by applying predetermined mathematics transformation, such as linear transformation or affine transformation, to the position coordinates of an element included in the first moving object (e.g., the target user 140). Further, the rule data 210 may define a rule for changing the length of the link element 180, rotating the link element 180, changing the size of the polygon element 182, and so forth. Still further, the rule data 210 may define a rule for determining the position of the link element 180 (or the polygon element 182) included in the second moving object (e.g., the spider object 212), based on the link element 180 (or the polygon element 182) included in the first moving object (e.g., the target user 140).

Yet further, the rule data 210 may define a rule for setting, as the node position coordinates 206 of the second motion data 204-2, one of the node position coordinates 206 contained in the first motion data 204-1, the one being determined based on a random number.

Then, the produced motion data producing unit 166 outputs the thus produced motion data to the motion data storage unit 160.

The image producing unit 168 produces an image of the moving object identified by the second moving object ID 174-2 contained in the received identifier data 176 held in the received identifier data holding unit 152, based on the produced motion data produced by the produced motion data producing unit 166. In the second embodiment, the image producing unit 168 outputs the produced image of the moving object to the UI unit 24, such as a display, of the information processing device 2 to display thereon.

Figure 22:
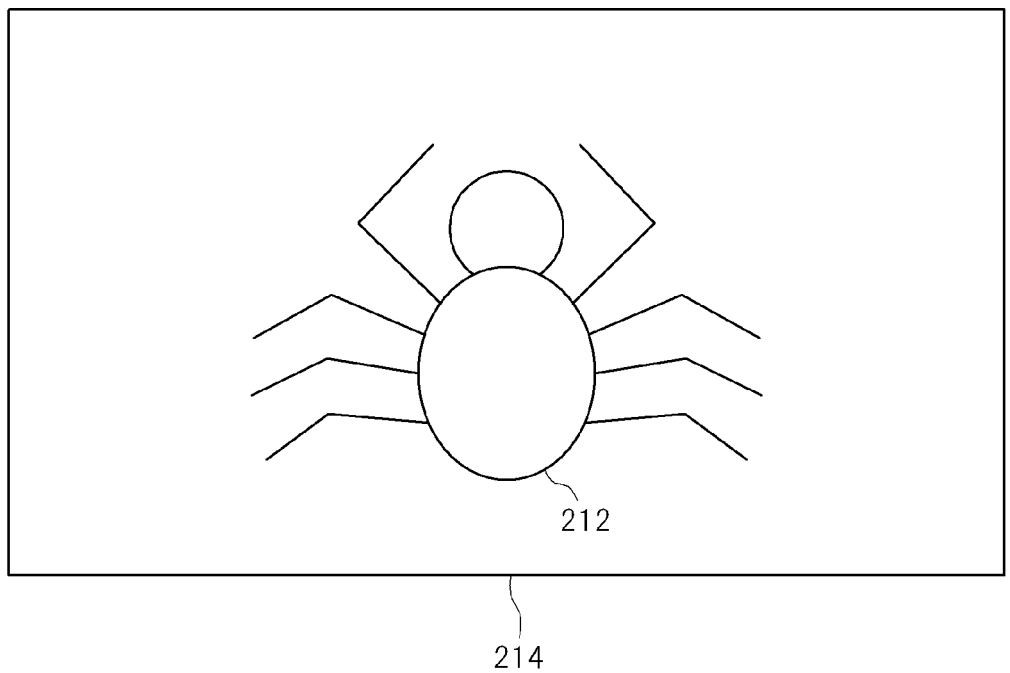
FIG. 22 is a diagram showing one example of a spider image.

Specifically, for example, the image producing unit 168 produces the spider image 214 shown in FIG. 22, based on the position coordinates of the respective elements included in the spider object 212 shown in FIG. 21. In the second embodiment, the image producing unit 168 sequentially produces the image of a moving object, and sequentially outputs to the UI unit 24 of the information processing device 2. As a result, the moving object is shown moving on the UI unit 24 of the information processing device 2.

In the following, a flow of a process to be carried out, when the received identifier data 176 containing the first moving object ID 174-1 having the number "1" and the second moving object ID 174-2 having the number "2" are held in the received identifier data holding unit 152, after obtaining the user image 142 (correlated to the frame ID 144 having the number "t") shown in FIG. 12 and before outputting the spider image 214 shown in FIG. 22 to the UI unit 24 of the information processing device 2 to display thereon will be described with reference to the flowchart shown in FIG. 23.

Initially, the base motion data producing unit 156 specifies the position coordinates of each of the node elements 178 included in the target user 140 shown in the user image 142 (S201). Then, the base motion data producing unit 156 produces motion data 204 that contains the frame ID 144 having the number "t", the moving object ID 174 having the number "1", the node ID 192 of each node element included in the target user 140, and the node position coordinates 206 of the node element 178 (S202). In the above, as a plurality of node elements 178 are included in the target user 140 shown in the user image 142, the base motion data producing unit 156 resultantly produces a plurality of motion data 204.

Then, the base motion data obtaining unit 158 obtains the motion data 204 produced in the process at S202, and outputs to the motion data storage unit 160 (S203).

Then, the rule data selecting unit 164 selects the rule data 210 contained in the moving object correspondence management data 208 that contains the first moving object ID 174-1 having the number "1" and the second moving object ID 174-2 having the number "2", from among the moving object correspondence management data 208 stored in the rule data storage unit 162 (S204).

Then, the produced motion data producing unit 166 obtains the motion data 204 that contains the moving object ID 174 having the number "1", output to the motion data storage unit 160 in the process at S203 (S205).

Then, the produced motion data producing unit 166 applies the rule defined in the rule data 210 selected in the process at S204 to the motion data 204 obtained in the process at S205 to thereby calculate the position coordinates of each node element 178 included in the spider object 212 (S206).

Then, the produced motion data producing unit 166 produces motion data 204 that contains the frame ID 144 having the number "t", the moving object ID 174 having the number "2", the node ID 192 of each node element 178 included in the spider object 212, and the node position coordinates 206 of the node element 178 (S207), and then outputs the motion data produced in the process at S207 to the motion data storage unit 160 (S208).

Then, the image producing unit 168 obtains the motion data 204 that contains the frame ID 144 having the number "t" and the moving object ID 174 having the number "2" (S209).

Then, the image producing unit 168 produces the spider image 214, based on the motion data 204 obtained in the process at S208, and outputs to the UI unit 24 of the information processing device 2 (S210).

In the above-described process example, the base motion data obtaining unit 158 sequentially obtains the motion data 204 containing the node position coordinates 206 of each node element 178 included in the target user 140 in each of the frames. Then, the produced motion data producing unit 166 sequentially applies the rule defined by the rule data selected by the rule data selecting unit 164 to the respective motion data sequentially obtained by the base motion data obtaining unit 158 to sequentially produce the motion data 204 that contains the node position coordinates 206 of each node element 178 included in the spider object 212 in each frame. Therefore, in the above-described process example, sequential production of the spider image 214 in connection with sequential obtaining of the user image 142 is possible. According to the above-described process example, it is possible to output a motion image showing the spider object 212 moving, to the UI unit 24 of the information processing device 2 to display thereon on a substantially real time basis, while capturing the image of the target user 140 (person) moving, using the image capturing unit 36 of the portable game device 3.

As described above, it is possible to readily produce the spider image 214, based on the user image 142 of the target user 140. Obviously, when the moving object name button 172 labeled as "crab", "octopus", "car", or "plane" in the second moving object selection screen image is pressed by a user, the rule data selecting unit 164 selects the rule data 210 for the respective moving object. That is, it is possible to produce various images, such as, e.g., a crab image, an octopus image, a car image, a plane image, and so forth, based on the user image 142 of the target user 140.

Note that the base motion data is not necessarily motion data 204 showing the target user 140 moving, and that the produced motion data is not necessarily motion data 204 showing the spider object 212 moving. That is, the information processing device 2 may receive a spider image 214 produced by capturing an image of a spider, using the image capturing unit 36 of the portable game device 3, and the base motion data producing unit 156 may produce motion data 204 (base motion data) showing the spider object 212 moving, based on the spider image 214. Further, the produced motion data producing unit 166 may produce motion data 204 (produced motion data) showing a person moving, based on the motion data 204 showing the spider object 212 moving.

Note that in a case in which rule data 210 for various moving objects are stored in the rule data storage unit 162, as described above, it is possible to produce motion data 204 showing motions of various moving objects and an image based on the motion data 204, based on the motion data 204 showing motions of various moving objects, according to the moving object ID 174 received by the identifier receiving unit 150.

According to the second embodiment, as an image or a mobile image of a moving object identified by an identifier received from a user can be readily produced, it is possible to reduce an operation by a creator required in CG creation utilizing motion data.

Note that the present invention is not limited to the above-described embodiment.

For example, in a case in which motion data 204 showing a predetermined moving object moving is stored in advance in a server (not shown) or the like connected via a network, such as the Internet, to the information processing device 2, the base motion data obtaining unit 158 may obtain the motion data 204 stored in the server or the like, and the produced motion data producing unit 166 may newly produce motion data 204, using the motion data 204.

Further, the portable game device 3 may additionally send the distance data produced by the distance measuring unit 37 of the portable game device 3 to the information processing device 2, and the base motion data producing unit 156 may determine the position coordinates (e.g., 3D positional coordinates) of each node element 178, utilizing the distance between the portable game device 3 and the target user 140, indicated by the distance data. That is, the communication unit 33 of the portable game device 3 sends the image data 146 that contains the frame ID 144, the user image 142, and the distance data to the information processing device 2, and the communication unit 23 of the information processing device 2 may receive the image data 146.

Further, for example, the information processing system 1 may include a video camera having an image capturing function and a distance measuring function, instead of the portable game device 3. That is, a video camera having an image capturing function and a distance measuring function may be used instead of the portable game device 3.

Further, the above-described information processing device 2 and the portable game device 3 maybe mounted in a single housing.

Further, a moving object need not include two or more elements.

In the following, an example of utilizing the motion data produced as described above is described.

For example, the produced motion data 204 maybe uploaded from the communication unit 23 of the information processing device 2 to a server (not shown) connected via a network, such as the Internet. In the above, a user may upload the motion data 204 so as to be correlated to attribute data, such as data indicating a game title that uses the motion data 204, data indicating a creator of the motion data 204, data indicating the motion data 204 (base motion data) used as a base in production of the motion data 204, data indicating a CG character created based on the motion data 204, and so forth. In the server, the motion data 204 may be stored so as to be correlated to the attribute data. The motion data 204 may be converted into data described in an existent script language before being stored in the server.

It may be arranged such that a user can view the motion data 204 stored in the server, using, e.g., a browser or the like. In the above, the motion data 204 maybe categorically shown. Further, the motion data 204 may be shown as an icon. Specifically, for example, the motion data 204 maybe expressed on a browser by means of a wire frame or as a motion of a character or the like.

A user who uploads the motion data 204 may set a user to which the motion data 204 is to be disclosed so that only the set user can view the motion data 204.

The motion data 204 to be viewed may be hyperlinked to a network store of motion data 204 so that a user can purchase the motion data 204 by clicking the hyperlink.

Further, the information processing device 2 may serially download newly uploaded motion data 204 in a server via a network to cache in the storage unit 22 of the information processing device 2. For example, the motion data 204 may be stored in the storage unit 22 of the information processing device 2 together with the save data of a game.

Further, for example, the information processing device 2 may compare motion data 204 expressing a person dancing or swinging for golf, stored in the server, and motion data 204 produced based on a series of user images 42 captured, using the image capturing unit 36 of the portable game device 3, and calculates a point based on an extent of correspondence of the respective motion data 204.

The invention claimed is:

1. An information processing device for producing motion data describing a motion of a predetermined moving object including a plurality of elements, comprising:
   a base data obtaining unit operating to obtain a plurality of base data each containing an image produced by capturing an image of at least one object, including the moving object, using an image capturing unit, and distance data indicating a distance between the object shown in the image and the image capturing unit, the distance data being based on a measured result obtained by a distance measuring unit;
   an in-image position specifying unit operating to specify an in-image position where each of at least some of the elements included in the moving object is shown in the image, based on the image contained in each base data;
   a distance specifying unit operating to specify a distance between each of the at least some of the elements included in the moving object and the image capturing unit, based on the in-image position specified by the in-image position specifying unit and the distance data contained in the base data that contains the image;
   a position coordinate calculating unit operating to calculate position coordinates of each of the at least some of the elements included in the moving object in a 3D space, based on the in-image position specified by the in-image position specifying unit and the distance specified by the distance specifying unit; and
   a motion data producing unit operating to produce motion data describing a motion of the moving object in the 3D space, based on the position coordinates calculated based on the base data,
   wherein when position coordinates of a missing element among the plurality of elements included in the moving object are not calculated by the position coordinate calculating unit, based on the base data, the position coordinate calculating unit calculates the position coordinates of the missing element, based on base data different from the base data among the plurality of base data obtained by the base data obtaining unit.

2. The information processing device according to claim 1, wherein when a situation in which the position coordinates of the missing element are not calculated by the position coordinate calculating unit lasts for a predetermined period of time, the position coordinate calculating unit calculates the position coordinates of the missing element, based on position coordinates of the missing element last calculated before the predetermined period of time and position coordinates of the missing element initially calculated after the predetermined period of time.

3. The information processing device according to claim 1, wherein when the position coordinates of the missing element are not calculated by the position coordinate calculating unit, the position coordinates of the missing element are calculated based on a difference in position coordinates of the missing element, calculated based on a plurality of respective base data different from the base data.

4. The image processing device according to claim 1, wherein
   the base data contains images produced using a plurality of respective image capturing units and distance data indicating distances between the object shown in the respective images and the respective image capturing units that capture the respective images,
   the in-image position specifying unit, based on the plurality of respective images contained in the base data, specifies in-image positions where the moving object is shown in the respective images;

the distance specifying units operates to specify a distance between the moving object and each of the plurality of image capturing units, and the position coordinate calculating unit calculates the position coordinates, based on the plurality of in-image positions specified by the in-image position specifying unit and the plurality of distances specified by the distance specifying unit.

5. An information processing method for producing motion data describing a motion of a predetermined moving object including a plurality of elements, comprising:

obtaining a plurality of base data each containing an image produced by capturing an image of at least one object, including the moving object, using an image capturing unit, and distance data indicating a distance between the object shown in the image and the image capturing unit, the distance data being based on a measured result obtained by a distance measuring unit;

specifying an in-image position where each of at least some of the elements included in the moving object is shown in the image, based on the image contained in each base data;

specifying a distance between each of the at least some of the elements included in the moving object and the image capturing unit, based on the in-image position specified and the distance data contained in the base data that contains the image, calculating position coordinates of each of the at least some of the elements included in the moving object in a 3D space, based on the in-image position specified and the distance specified; and producing motion data describing a motion of the moving object in the 3D space, based on the position coordinates calculated based on the base data, wherein when position coordinates of a missing element among the plurality of elements included in the moving object are not calculated, based on the base data, the position coordinate calculating step includes calculating the position coordinates of the missing element, based on base data different from the base data among the plurality of base data obtained.

6. A computer including a processor operating to execute a program, which causes the computer to function as an information processing device for data describing a motion of a predetermined moving object including a plurality of elements, the program for causing the computer to execute actions, comprising:

obtaining a plurality of base data each containing an image produced by capturing an image of at least one object, including the moving object, using an image capturing unit, and distance data indicating a distance between the object shown in the image and the image capturing unit, the distance data being based on a measured result obtained by a distance measuring unit;

specifying an in-image position where each of at least some of the elements included in the moving object is shown in the image, based on the image contained in each base data;

specifying a distance between each of the at least some of the elements included in the moving object and the image capturing unit, based on the in-image position and the distance data contained in the base data that contains the image, calculating position coordinates of each of the at least some of the elements included in the moving object in a 3D space, based on the in-image position and the distance; and producing motion data describing a motion of the moving object in the 3D space, based on the position coordinates calculated based on the base data, wherein when position coordinates of a missing element among the plurality of elements included in the moving object are not calculated, based on the base data, the position coordinate calculation includes calculating the position coordinates of the missing element, based on base data different from the base data among the plurality of base data obtained.

7. A non-transitory, computer readable information storage medium storing a program for causing a computer to function as an information processing device for producing motion data describing a motion of a predetermined moving object including a plurality of elements, the program for causing the computer to function as:

a base data obtaining unit operating to obtain a plurality of base data each containing an image produced by capturing an image of at least one object, including the moving object, using an image capturing unit, and distance data indicating a distance between the object shown in the image and the image capturing unit, the distance data being based on a measured result obtained by a distance measuring unit;

an in-image position specifying unit operating to specify an in-image position where each of at least some of the elements included in the moving object is shown in the image, based on the image contained in each base data;

a distance specifying unit operating to specify a distance between each of the at least some of the elements included in the moving object and the image capturing unit, based on the in-image position specified by the in-image position specifying unit and the distance data contained in the base data that contains the image;

a position coordinate calculating unit operating to calculate position coordinates of each of the at least some of the elements included in the moving object in a 3D space, based on the in-image position specified by the in-image position specifying unit and the distance specified by the distance specifying unit; and a motion data producing unit operating to produce motion data describing a motion of the moving object in the 3D space, based on the position coordinates calculated based on the base data, wherein when position coordinates of a missing element among the plurality of elements included in the moving object are not calculated by the position coordinate calculating unit, based on the base data, the position coordinate calculating unit calculates the position coordinates of the missing element, based on base data different from the base data among the plurality of base data obtained by the base data obtaining unit.

* * * * *